United States Patent
Singh et al.

(10) Patent No.: US 11,507,908 B2
(45) Date of Patent: Nov. 22, 2022

(54) SYSTEM AND METHOD FOR DYNAMIC PERFORMANCE OPTIMIZATION

(71) Applicant: ACCENTURE GLOBAL SOLUTIONS LIMITED, Dublin (IE)

(72) Inventors: Sandeep Singh, Navi Mumbai (IN); Ankur Chaudhary, Gurgaon (IN); Ravi Alok Sinha, Ranchi (IN); Anil Vohra, Pradesh (IN); Deepa Yendigeri, Pune (IN); Kartik Ganesh Nagrajan, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/204,721

(22) Filed: Mar. 17, 2021

(65) Prior Publication Data
US 2022/0300881 A1 Sep. 22, 2022

(51) Int. Cl.
G06Q 10/06 (2012.01)
G06N 20/00 (2019.01)
G06Q 10/04 (2012.01)

(52) U.S. Cl.
CPC ....... *G06Q 10/06393* (2013.01); *G06N 20/00* (2019.01); *G06Q 10/04* (2013.01)

(58) Field of Classification Search
CPC ...... G06N 20/00; G06N 7/005; G06Q 10/103; G06Q 10/06393; G06Q 10/0637; G06Q 10/06; G06Q 10/0635; G06Q 10/067; G06Q 10/0639; G06Q 10/063; G06Q 10/06313
See application file for complete search history.

(56) References Cited

U.S. PATENT DOCUMENTS 7,366,680 B1 * 4/2008 Creel ............ G06Q 10/063118
705/7.17
7,822,747 B2 * 10/2010 Clark .................. G06N 5/022
707/758

(Continued)

OTHER PUBLICATIONS

Oracle Project Financial Planning—User's Guide—Release 11.1.22 Oracle, 2012 (Year: 2012).*

(Continued)

*Primary Examiner* — Scott L Jarrett
(74) *Attorney, Agent, or Firm* — Mannava & Kang, P.C.

(57) ABSTRACT

A system for value prediction for dynamic performance optimization includes a project value predictor that receives a Key Performance Indicator (KPI) and an initiative relating to an active project having a closure date. The KPI is associated with a KPI period including multiple intervals. The project value predictor operates to identify a relevant cluster of KPIs for the KPI based on historical data, forecast a future value of the KPI based on attributes/features of the KPI relative to the closure date, predict a possibility of failure of the KPI using a trained data model to pre-classify the KPI, categorize the KPI based on the future value or the pre-classification, where the KPI is categorized as failure based on the future value being less than a target KPI value after the KPI period and added to list for retraining the model based on the categorization. The system also leads to the identification and subsequent validation of Initiatives that impact the KPIs with quantification of the level of impact.

20 Claims, 21 Drawing Sheets

(56) References Cited

U.S. PATENT DOCUMENTS

| | | | | |
|---|---|---|---|---|
| 8,185,428 | B1* | 5/2012 | Campo | G06Q 10/0639 |
| | | | | 705/7.38 |
| 8,306,841 | B2* | 11/2012 | Clarke | G06Q 10/06315 |
| | | | | 705/7.17 |
| 8,355,926 | B1 | 1/2013 | Hinz et al. | |
| 8,364,519 | B1* | 1/2013 | Basu | G06Q 10/06393 |
| | | | | 705/7.38 |
| 8,626,698 | B1* | 1/2014 | Nikolaev | G06Q 10/06393 |
| | | | | 705/7.17 |
| 9,251,484 | B2* | 2/2016 | Cantor | G06Q 10/063114 |
| 10,592,743 | B2 | 3/2020 | Borrel et al. | |
| 10,621,498 | B1* | 4/2020 | Tegtmeyer | G06N 5/048 |
| 10,671,352 | B2* | 6/2020 | Prabha | G06F 11/302 |
| 10,839,326 | B2* | 11/2020 | Gamare | G06N 20/00 |
| 10,929,268 | B2* | 2/2021 | Bhat | G06F 11/3616 |
| 11,157,853 | B2* | 10/2021 | Blomberg | G06Q 10/06315 |
| 2003/0023470 | A1* | 1/2003 | Labbi | G06Q 10/06313 |
| | | | | 705/7.23 |
| 2003/0046125 | A1* | 3/2003 | Flores | G06Q 10/0639 |
| | | | | 705/7.38 |
| 2003/0208429 | A1* | 11/2003 | Bennett | G06Q 10/063 |
| | | | | 705/36 R |
| 2004/0068429 | A1* | 4/2004 | MacDonald | G06Q 30/0201 |
| | | | | 705/7.29 |
| 2004/0138944 | A1* | 7/2004 | Whitacre | G06Q 10/06398 |
| | | | | 705/7.42 |
| 2005/0289503 | A1* | 12/2005 | Clifford | G06F 8/20 |
| | | | | 717/101 |
| 2006/0010164 | A1* | 1/2006 | Netz | G06Q 10/06 |
| 2008/0201397 | A1* | 8/2008 | Peng | G06Q 10/0639 |
| | | | | 708/308 |
| 2008/0235151 | A1* | 9/2008 | Subramanian | G06Q 40/00 |
| | | | | 705/36 R |
| 2008/0312979 | A1* | 12/2008 | Lee | G06Q 10/0635 |
| | | | | 705/7.39 |
| 2009/0119144 | A1* | 5/2009 | Goyal | G06Q 10/0631 |
| | | | | 705/7.12 |
| 2009/0138316 | A1* | 5/2009 | Weller | G06Q 10/063 |
| | | | | 705/7.11 |
| 2009/0157447 | A1* | 6/2009 | Busch | G06Q 10/10 |
| | | | | 705/7.38 |
| 2010/0138807 | A1* | 6/2010 | Bogdan | G06Q 10/06 |
| | | | | 717/101 |
| 2010/0274621 | A1* | 10/2010 | Diwakar | G06Q 10/063116 |
| | | | | 718/102 |
| 2011/0054968 | A1* | 3/2011 | Galaviz | G06Q 10/10 |
| | | | | 705/7.41 |
| 2011/0119193 | A1* | 5/2011 | McLees | G06Q 10/00 |
| | | | | 705/348 |
| 2012/0109697 | A1* | 5/2012 | Hickey | G06Q 10/063 |
| | | | | 705/500 |
| 2012/0197888 | A1* | 8/2012 | King | G06N 20/00 |
| | | | | 707/E17.089 |
| 2012/0317536 | A1* | 12/2012 | Erickson | G06Q 10/0639 |
| | | | | 717/101 |
| 2013/0006694 | A1* | 1/2013 | Hicks | G06Q 10/06 |
| | | | | 705/7.23 |
| 2013/0311968 | A1* | 11/2013 | Sharma | G06F 11/3692 |
| | | | | 717/101 |
| 2013/0325763 | A1* | 12/2013 | Cantor | G06Q 10/06312 |
| | | | | 706/12 |
| 2013/0332243 | A1* | 12/2013 | Gifford | G06Q 10/063 |
| | | | | 705/7.37 |
| 2013/0332244 | A1* | 12/2013 | Gifford | G06Q 10/063 |
| | | | | 705/7.38 |
| 2014/0122144 | A1* | 5/2014 | Cirpus | G06Q 10/06 |
| | | | | 705/7.14 |
| 2014/0195308 | A1* | 7/2014 | Reddington | G06Q 10/0637 |
| | | | | 705/7.36 |
| 2014/0236667 | A1* | 8/2014 | Gifford | G06Q 10/0635 |
| | | | | 705/7.28 |
| 2015/0339604 | A1* | 11/2015 | Alikhan | G06Q 10/0635 |
| | | | | 705/7.28 |
| 2016/0110665 | A1* | 4/2016 | Dey | G06Q 10/06313 |
| | | | | 705/7.23 |
| 2016/0140474 | A1* | 5/2016 | Vekker | G06Q 10/06393 |
| | | | | 705/7.39 |
| 2016/0224896 | A1* | 8/2016 | Pinel | G06F 17/16 |
| 2017/0300844 | A1* | 10/2017 | Urry | G06Q 10/06313 |
| 2018/0107959 | A1* | 4/2018 | Gamare | G06N 20/00 |
| 2018/0174066 | A1* | 6/2018 | Venkataraman | G06Q 10/0639 |
| 2018/0374010 | A1* | 12/2018 | Burde | G06N 5/045 |
| 2019/0034841 | A1* | 1/2019 | Arora | G06Q 10/087 |
| 2019/0122153 | A1* | 4/2019 | Meharwade | G06Q 10/06313 |
| 2019/0155577 | A1* | 5/2019 | Prabha | G06Q 10/0635 |
| 2021/0125148 | A1* | 4/2021 | Kulkarni | G06Q 10/103 |
| 2021/0287177 | A1* | 9/2021 | Musialek | G06Q 10/06312 |
| 2021/0319513 | A1* | 10/2021 | Prates de Oliveira | G06F 17/18 |
| 2021/0390496 | A1* | 12/2021 | Miller | G06F 9/547 |
| 2022/0044174 | A1* | 2/2022 | Kumar | G06Q 10/067 |

OTHER PUBLICATIONS

Kerzner, Harold, Project Management Metrics, KPIs and Dashboards—A Guide to Measuring and Monitoring Project Performance Wiley, Second Edition, 2013 (Year: 2013).*

Hopskinson, Martin, The Case for Project New Present Value (NPV) and NPV Risk Models PM World Journal, Volo. V, Issue VI, Jun. 2016 (Year: 2016).*

Ko, Chien-Ho et al., Dynamic Prediction of Project Success Using Artificial Intelligence Journal of Construction Engineering and Management, ASCE, Apr. 2007 (Year: 2007).*

Fauser, Jochen et al., The Prediction of Success in Project Management—Predictive Project Analytics 2016 (Year: 2016).*

Predictive Project Analytics 2.0 Deloitte, 2016 (Year: 2016).*

Philbin, Simon P. et al., Diagnostic Framework and Health Check Tool for Engineering and Technology Projects Journal of Industrial Engineering and Management, vol. 7, No. 5, 2014 (Year: 2014).*

Wohlin, C. et al., Evaluation of Three Methods to Predict Project Success: A Case Study Proceedings of International Conference on Product Focused Software Process Improvement, 2005 (Year: 2005).*

Illahi, Inam et al., Machine learning based success prediction for crowdsourcing software projects The Journal of Systems and Software, vol. 178, 2021 (Year: 2021).*

Mahdi, Mohammed Najah et al., Software Project Management Using Machine Learning Technique—A Review Applied Sciences, vol. 11, 2021 (Year: 2021).*

Ruiz, Jesus Gil et al., The Application of Artificial Intelligence in Project Management Research: A Review International Journal of Interactive Multimedia and Artificial Intelligence, vol. 6, No. 6, 2020 (Year: 2020).*

* cited by examiner

| Value Realization Application | Project: Finance Transformation Golden Sample | | | Admin Access | Home | Workplace | Tool Help |
|---|---|---|---|---|---|---|---|
| Initiate | Setup Value Tracking | Define Baseline & Set Targets | Track & Update | | | | |
| Import from Existing Project  Enter Project Details  Setup Project Team  Tracking Approach | | | | | | | |

Manage Access ⓘ

| Name | Email id | Access Level | |
|---|---|---|---|
| Abc | Abc@xyz.com | Owner | ˅ |
| Def | Def@xyz.com | Owner | ˅ |
| Ghi | Ghi@xyz.com | View and Edit | ˅ |
| Jkl | Jkl@xyz.com | View | ˅ |

Back   Save

Proceed

FIG. 6A

| Value Realization Application | Project: Finance Transformation Golden Sample | | | | Home | Workplace | Tool Help |
|---|---|---|---|---|---|---|---|
| Initiate | Import Business Case | Setup Value Tracking | Define Baseline & Set Targets | Track & Update | Dashboards | | |

Tracking Approach     Attributes and Tracking Period     Customize Attributes     Add KPIs     < 2/8 >

Attributes and hierarchy

Level 01     >     Level 02     >     Level 03     >

Functions
- L1
- L2
- L3

Business unit
- Business unit
- Sub-business unit

Geography
- Region
- Country
- Location

Tracking Period

Monthly   >

Start date
2018 ∨ SEP ∨

End date
2019 ∨ AUG ∨

Back    Save    Proceed

| Value Realization Application | | Project: *Finance Transformation Golden Sample* | | Home | Workplace | Tool Help |
|---|---|---|---|---|---|---|
| Initiate | Import Business Case | Setup Value Tracking | Define Baseline & Set Targets | Track & Update | Dashboards | |
| Map KPI to Attributes | | Add Initiatives | | Map Initiatives to KPI | Add Owners | ‹ 6/8 › |

Add/ Edit Initiatives

☐ Workstream ☐ Program                                                                        ≡ Filter

| # | Initiative Name | Category | Start Date | End Date | Status | | |
|---|---|---|---|---|---|---|---|
| | ● New Initiative | | | | | | |
| 1 | Intercompany Process Automation<br>Add description | Technology- Intelligent Automation ▾ | 2018 ▾ SEP ▾ | 2019 ▾ AUG ▾ | In Progress ▾ | ✎ | |
| 2 | Journal Voucher Workflow Automation<br>Add description | Technology- Intelligent Automation ▾ | 2018 ▾ DEC ▾ | 2019 ▾ JUN ▾ | In Progress ▾ | ✎ | |
| 3 | Journal Entry Accrual Elimination Automati<br>Add description | Technology- Intelligent Automation ▾ | 2018 ▾ SEP ▾ | 2019 ▾ AUG ▾ | In Progress ▾ | ✎ | |
| 4 | Account Reconciliation Automation<br>Add description | Technology- Intelligent Automation ▾ | 2018 ▾ DEC ▾ | 2019 ▾ JUN ▾ | In Progress ▾ | ✎ | |
| 5 | Automated Close Management and Conso<br>Add description | Technology- Intelligent Automation ▾ | 2018 ▾ SEP ▾ | 2019 ▾ AUG ▾ | In Progress ▾ | ✎ | |
| 6 | Enhanced Financial Data Visibility and Acc<br>Add description | Technology- Intelligent Automation ▾ | 2018 ▾ DEC ▾ | 2019 ▾ JUN ▾ | In Progress ▾ | ✎ | |

Back   Save   Proceed

FIG. 6D

| Value Realization Application | Project: *Finance Transformation Golden Sample* | | | | Home | Workplace | Tool Help |
|---|---|---|---|---|---|---|---|
| Initiate | Import Business Case | Setup Value Tracking | Define Baseline & Set Targets | Track & Update | | | |
| | Dashboards | | | | | | |

Define Initiatives     Map Initiatives to KPI     Add Owners     ⟨ 7/7 ⟩

Add Owners ⓘ

| Add Owners | Map KPI Owners | Map Initiative Owners |
|---|---|---|

| Name | Email | Initiative Owner | KPI Owner | |
|---|---|---|---|---|
| Abc | Abc@xyz.com | ☑ | ☑ | ✎ |
| Def | Def@xyz.com | ☑ | ☐ | ✎ |
| Ghi | Ghi@xyz.com | ☐ | ☑ | ✎ |
| Jkl | Jkl@xyz.com | ☑ | ☑ | ✎ |
| Mno | Mno@xyz.com | ☐ | ☑ | ✎ |

Back    Save    Proceed

FIG. 6E

| Value Realization Application | Project: *Finance Transformation Golden Sample* | | | | Home | Workplace | Tool Help |
|---|---|---|---|---|---|---|---|
| Initiate | Import Business Case | Setup Value Tracking | Define Baseline & Set Targets | Track & Update | Dashboards | | |
| Set KPI Targets | KPI Benefit Allocation | Set Initiative Costs | | | | | |

Define Baseline and Set KPI Targets

| Attribute Level Details | | Period Wise Details | | View Summary | | | | ≡ Filter |
|---|---|---|---|---|---|---|---|---|

KPI Name
◉ % of Supplier Invoices Submitted Electronically ▼

| # | Business Unit | | Sub-business Unit | Region | Country | Location | | |
|---|---|---|---|---|---|---|---|---|
| 1 | Manufacturing | | Manufacturing Sub BU 2 | North America | United States of America | Location 1 | ◉ | ︿ |

| User input ⦚ | UOM | As - Is Value | To - Be Value | Sep/2018 | Oct/2018 | No/2018 | Dec/2018 | Jan/2019 | Feb/2019 | ﹀ |
|---|---|---|---|---|---|---|---|---|---|---|
| KPI Value | % | 15 | 26.89 | 15 | 15.82 | 16.68 | 17.59 | 18.55 | 19.56 | |
| Benefit Value | USD | | 89175 | 0 | 6150 | 6450 | 6825 | 7200 | 7575 | |
| # of Electronic Invoices | # | 15000 | 16735.03 | 15000 | 15150 | 15301.5 | 15609.06 | 15609.06 | 15765.15 | |
| # of Electronic Invoices | # | 2250 | 4500 | 2250 | 2396.34 | 2552.2 | 2718.2 | 2895 | 3083.29 | |
| Cost per Supplier Invoice | USD | 50 | 50 | 50 | 50 | 50 | 50 | 50 | 50 | |

◉ A/P FTEs per B of Revenue ▼

⦚

Back | Save | Proceed

FIG. 6F

| Value Realization Application | Project: Finance Transformation Golden Sample | | | Home | Workplace | Tool Help |

Initiate   Import Business Case   Setup Value Tracking   Define Baseline & Set Targets   Track & Update   Dashboards Set KPI Targets   KPI Benefit Allocation   Set initiative Costs

● Integrate tax data and reporting requirements into financial systems ▶

| # | Business Unit | Sub-business Unit | Region | Country | Location | | |
|---|---|---|---|---|---|---|---|
| 1 | Manufacturing | Manufacturing Sub BU 1 | APAC | Japan | Location 10 | ● | ∨ |

| User Input 🗐 | UOM | Total Values | Apply to all | Sep/2018 | Oct/2018 | Nov/2018 | Dec/2018 | Jan/2019 | Feb/2019 ❯ |
|---|---|---|---|---|---|---|---|---|---|
| Total Cost | USD | 3966.84 | | | 330.57 | 330.57 | 330.57 | 330.57 | 330.57 ▼ |
| Capex | USD | 2380.08 | | | 198.34 | 198.34 | 198.34 | 198.34 | 198.34 ▼ |
| License | USD | 1190.04 | ↑ ___ | | 99.17 | 99.17 | 99.17 | 99.17 | 99.17 |
| Hardware | USD | 991.68 | ↑ ___ | | 82.64 | 82.64 | 82.64 | 82.64 | 82.64 |
| Additional Hardware | USD | 198.36 | | | 16.53 | 16.53 | 16.53 | 16.53 | 16.53 |
| Opex | USD | 1586.76 | ↑ ___ | | 132.23 | 132.23 | 132.23 | 132.23 | 132.23 ▼ |
| Maintenance and Support | USD | 991.68 | ↑ ___ | | 82.64 | 82.64 | 82.64 | 82.64 | 82.64 |
| Training | USD | 198.36 | ↑ ___ | | 16.53 | 16.53 | 16.53 | 16.53 | 16.53 |
| Implementation | USD | 198.36 | | | 16.53 | 16.53 | 16.53 | 16.53 | 16.53 |
| Additional Services | USD | 198.36 | ↑ ___ | | 16.53 | 16.53 | 16.53 | 16.53 | 16.53 |

● Migrate to a single tax compliance software ▶

By Detailed Costing

Back   Save   Proceed

FIG. 6G

| Value Realization Application | Project: Finance Transformation Golden Sample | | Home | Workplace | Tool Help |

Initiate | Import Business Case | Setup Value Tracking | Define Baseline & Set Targets | Track & Update | Dashboards

Update Actual KPI Data | Actual KPI Benefit Allocation | Update Actual Initiative Costs

Actual KPI Data

KPI Name: % of Supplier Invoices Submitted Electronically

UOM: %

≡ Filter

Aggregated KPI value* ⌄

| Value Type | Baseline | Sep/2018 | Oct/2018 | Nov/2018 | Dec/2018 | Jan/2019 | Feb/2019 › |
|---|---|---|---|---|---|---|---|
| Actual | 13.94 | 13.94 | 14.63 | 15.65 | 16.35 | 17 | 18.21 |
| Target | 21.24 | 13.94 | 14.48 | 15.03 | 15.62 | 16.22 | 16.85 |
| Forecast | 13.94 | 13.94 | 14.63 | 15.03 | 15.62 | 16.22 | 16.85 |
| Actual Variance ⌄ | -34.37% | 0% | 1.04% | 3.53% | 4.67% | 4.81% | 8.07% |

| # | Business Unit ▼ | Sub-business Unit ▼ | Region ▼ | Country ▼ | Location ▼ | | Sep/2018 | Oct/2018 | Nov/2018 | Dec/2018 | Jan/2019 | Feb/2019 |
|---|---|---|---|---|---|---|---|---|---|---|---|---|
| 1 | Manufacturing | Manufacturing Sub BU 2 | North America | United States of America | Location 1 | Actual | 15 | 15.36 | 16.19 | 17.77 | 19.3 | 21.39 |
| | Manufacturing | Manufacturing Sub BU 2 | North America | United States of America | Location 1 | Target | 26.89 | 15 | 15.82 | 16.68 | 17.59 | 18.55 | 19.56 |

Back | Save | Process

FIG. 6H

| Value Realization Application | Project: Finance Transformation Golden Sample | | | | Home | Workplace | Tool Help |
|---|---|---|---|---|---|---|---|
| Initiate | Import Business Case | Setup Value Tracking | Define Baseline & Set Targets | Track & Update | Dashboards | | |
| Update Actual KPI Data | Actual KPI Benefit Allocation | Update Actual Initiative Costs | | | | | |

Actual Initiative Data

Initiative Name: Intercompany Process Automation

UOM: USD

Tracking Approach: By ROM Costing ⓘ

≡ Filter

| | Value Type | Baseline | Sep/2018 | Oct/2018 | Nov/2018 | Dec/2018 | Jan/2019 | Feb/2019 ▸ |
|---|---|---|---|---|---|---|---|---|
| | Actual | 9516.21 | 749.44 | 795.38 | 748.56 | 846.71 | 885.21 | 810.83 |
| | Target | 9625 | 802.08 | 802.08 | 802.08 | 802.08 | 802.08 | 802.08 |
| | Forecast | 9625 | 802.08 | 802.08 | 802.08 | 802.08 | 802.08 | 802.08 |
| | Actual Variance ⌄ | 1.13% | 6.56% | 0.84% | 6.67% | -5.56% | -10.36% | -1.09% |

Total Cost ⌄   Values* ⌄

| # | Business Unit ▾ | Sub-business Unit ▾ | Region ▾ | Country ▾ | Location ▾ | | | | | | | |
|---|---|---|---|---|---|---|---|---|---|---|---|---|
| 1 | Manufacturing | Manufacturing Sub BU 1 | North America | United States of America | Location 1 | Actual | 5361.71 | 420.44 | 515.38 | 447.56 | 479.21 | 479.21 | 506.33 |
| | Manufacturing | Manufacturing Sub BU 1 | North America | United States of America | Location 1 | Target | 5425 | 452.08 | 452.08 | 452.08 | 452.08 | 452.08 | 452.08 |

Back    Save

Receive a Key Performance Indicator (KPI) and a set of one or more initiatives related thereto for an active project having a predefined closure date, the KPI being associated with a KPI period and a target value, where the KPI period includes a plurality of intervals and defines a tracking period for the KPI
802

Identify a relevant KPI cluster for the KPI from a plurality of KPI clusters defined based on historical project data, the relevant KPI cluster including one or more KPIs and associated with a cluster target value, where the KPI cluster is identified as relevant upon being associated with key attributes of the KPI
804

Forecast a future value of the KPI, the future value corresponding to a value after the KPI period, where the future value is forecasted based on the attributes of the KPI with at least one of a value being precomputed at one of the plurality of intervals and a known value of the same KPI in the relevant KPI cluster after a duration equivalent to the KPI period
806

Predict a possibility of failure of the KPI based on a predefined data model to pre-classify the KPI, the predefined data model being trained based on a list of one or more failed KPIs associated with the historical project data, where the KPI is pre-classified as failure based on the KPI belonging to the list
808

Categorize the KPI based on one of the future value and the pre-classification of the KPI, the categorization indicating a KPI benefit, the KPI being categorized as failure based on the future value being less than the target value after the KPI period, where the KPI categorized as the failure is added to the list for retraining the predefined data model
810

FIG. 8A

SYSTEM AND METHOD FOR DYNAMIC PERFORMANCE OPTIMIZATION

BACKGROUND

Businesses are increasingly transitioning to new technologies (e.g., cybersecurity and robotics) for adapting to changing market needs. During a transition phase, the implementation of new technology is typically divided into initiatives relating to various business functions (e.g., sales, finance, manufacturing, etc.) for integration across different business units. Each initiative is generally handled as a project and managed by a project management office (PMO) of an organization. The PMO often manually collates information about the implementation of initiatives related to these segments and tracks their progress. Such manual operation makes it cumbersome to keep track of a return-on-investment (ROI) on a daily or a regular basis, particularly when the initiatives are being implemented at different times and for business units located in segregated geographies. Moreover, manual tracking often delays deriving insights into the impact of implementation on costs, people, product, and service for each business unit, and thus, may cause business disruption. Such delays in deriving insights may further lead to organizations not realizing the full range of financial benefits obtainable over time through such technology implementation programs.

Modern analytics systems provide data models to automate the tracking of ROI and the impact of these initiatives on business operations. However, these models are typically designed to yield insights specific to a single project or business unit. As a result, the data models need to be customized for each business unit or project type, even for common or shared business functions, thereby increasing model customization costs. The need for such customization may additionally cause operational delays or even disrupt technology-sensitive business operations. Moreover, the conventional data models usually provide insights into project value leakage only after established metrics have been violated, to risk business continuity.

BRIEF DESCRIPTION OF DRAWINGS

The illustrated embodiments of the present disclosure will be best understood by reference to the drawings, wherein like parts are designated by like numerals throughout. The following description is intended only by way of example, and simply illustrates certain selected embodiments of devices, systems, and processes that are consistent with the invention as claimed herein.

FIGS. 6A-6M are screenshots of displays provided by the system of FIG. 1, according to an example embodiment of the present disclosure.

FIGS. 8A-8B illustrate a method for implementing the system of FIG. 1, according to an example embodiment of the present disclosure.

DETAILED DESCRIPTION

Figure 1:
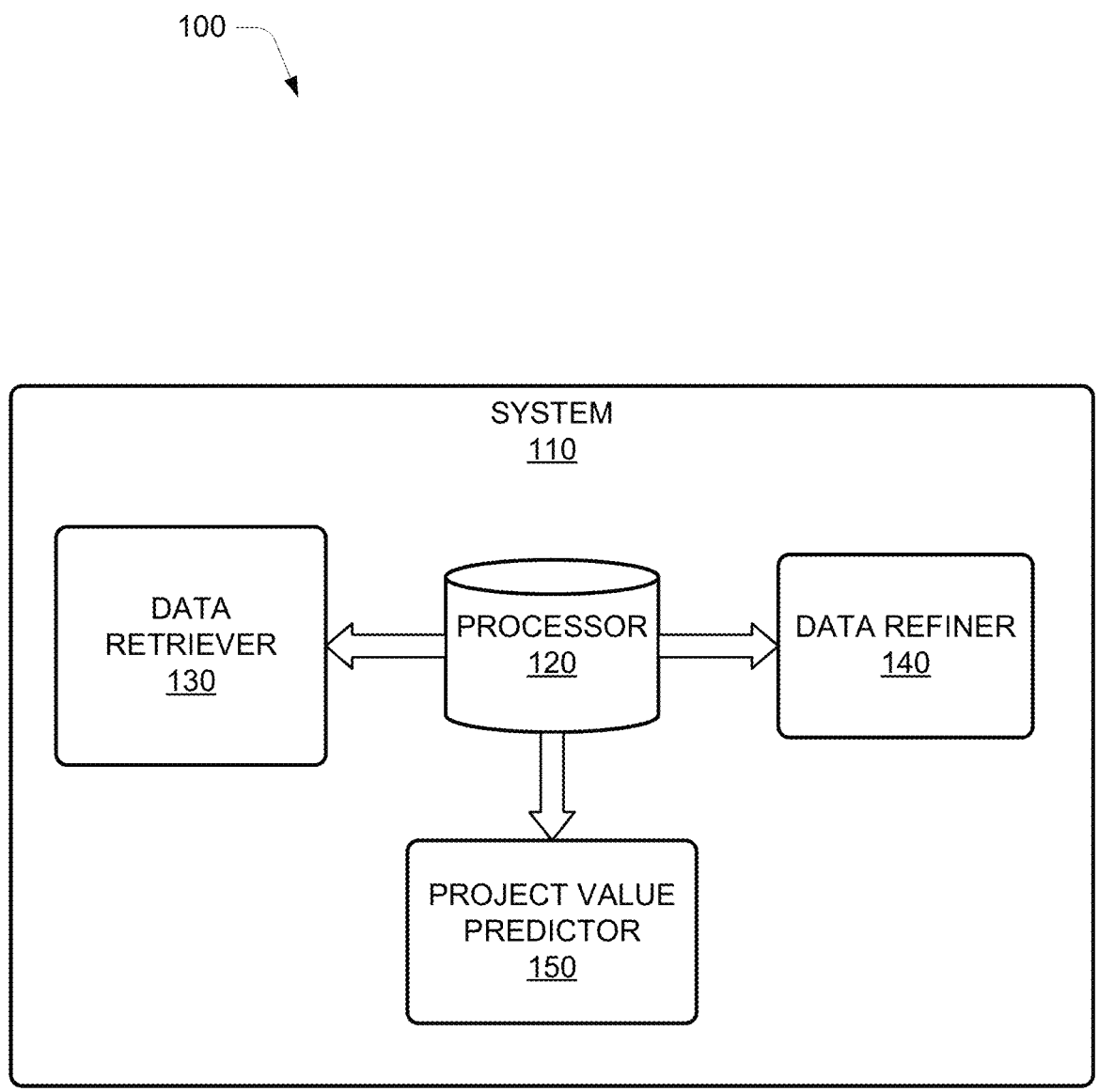
FIG. 1 illustrates a value realization analytics system, according to an example embodiment of the present disclosure.

For simplicity and illustrative purposes, the present disclosure is described by referring mainly to examples thereof. The examples of the present disclosure described herein may be used independently or together in different combinations. In the following description, details are set forth in order to provide an understanding of the present disclosure. It will be readily apparent, however, that the present disclosure may be practiced without limitation to any of these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

Various embodiments of the present disclosure describe value realization analytics systems for dynamic performance optimization. In an example, the embodiments may be implemented using a system including a data retriever, a data refiner, and a project value predictor. The data retriever may receive multiple Key Performance Indicators (KPIs) and initiatives relating to an active project having a predefined closure date and historical data relating to a historical project. The KPI may be associated with a current value, a target value, —a KPI period including multiple intervals, geography(ies) where the KPI may be tracked, industry/function related to the KPI, initiative(s) that may impact the KPI, and a favorability indicator indicating whether an increase or a decrease in KPI is a favorable outcome. The data refiner may train a multivariate regression model and a classification model based on the historical data including a mapping to geographies, industry/function to provide a first trained data model for forecasting a future KPI value and a second trained data model predicting a possibility of failure of the KPI respectively. The data refiner may also train a third data model (e.g., classification model) based on the historical data including a list of KPIs associated with a "success" category to provide a third trained data model to recommend the relevant KPIs that may be tracked based on additional inputs such as project type and an expected outcome (e.g., a KPI benefit value greater than a threshold or predefined target KPI benefit value) from the implementation. The project value predictor may operate to identify a relevant cluster of KPIs for the KPI based on the historical data, forecast the future value of the KPI based on a current value thereof relative to the project closure date using the first trained data model, predict a possibility of failure of the KPI based on the historical data to pre-classify the KPI using the second trained data model, categorize the KPI based on one of the future value and the pre-classification of the KPI, where the categorization may indicate a KPI value performance. The KPI may be categorized as failure based on the future value being less than a target KPI value after the KPI period. The KPI categorized as failure may assist to retrain the first trained data model. The project value predictor may further operate to calculate a cost performance for an initiative(s) impacting a KPI, calculate a KPI benefit value, calculate a net present value of the initiative based on the benefits from KPI (KPI benefit value) and costs incurred in implementation of the initiative, and categorize the initiative based on the calculated net present value. The initiative may be categorized as failure based on the net present value falling below or less than a predefined target net present value. The project value predictor may further operate to provide a recommendation assisting to initiate a process to recalibrate one of the input parameters to optimize the KPI performance or provide suggestions related to a rectifying initiative that should be undertaken to course correct (based on similar past experiences), evaluate an impact of the recalibration on the KPI performance and/or the net present value, assign a weight to the recommendation based on the evaluation, and provide a weighted recommendation as an optional recommendation for a subsequent analysis of the active project.

The present disclosure provides a value realization analytics system implementing predictive and prescriptive analytics to dynamically forecast, classify/categorize, recommend, assign, reassign, calibrate, and recalibrate process parameters. The present disclosure may track and determine a financial benefit being realized across multiple dimensions (e.g., industry/business function, business/service unit or a type thereof, geographical indicator, etc.) for a project during an intended period comparative to a benefit obtained for a historical project. The present disclosure may actively and periodically monitor KPIs and initiatives operating to implement a real-time project. The present disclosure may also help optimize project cost/benefit values as well as process performance and provide insights into a return-on-investment (ROI) on demand. The present disclosure may further recommend various inputs including those related to KPIs and initiatives for implementing a project. The present disclosure may also help initiate processes for recalibrating project inputs to optimize financial benefits obtainable over an intended period before a violation of established metrics or incurring a financial loss. The present disclosure may also help define and/or update benchmarking data relating to parameters based on a project type across different business units and geographies. Moreover, the present disclosure provides a platform-independent solution for tracking the progress of the project and/or the implemented KPIs and initiatives. In addition, the present disclosure may be utilized to provide predictive analytics information and services, such as Decision-as-a-Service™ services. The present disclosure may also help in identification of the efficacy of the Initiatives and the impact they have on the KPIs and their improvement.

Embodiments are described in the context of a manufacturing transformation program. However, it will be appreciated that the embodiments and concepts described herein may be applied in other scenarios involving a relationship between performance indicators and a performance-linked value. Examples of these scenarios may include, but are not limited to, platform implementation, business function transformation, digital transformation, mergers and acquisitions (M&A) integration, process improvement, service management, training and content management, human resource management, risk management, marketing and sales management, cost optimization and management, logistics management, and network security management.

FIG. 1 illustrates a system 110 to predict value for dynamic performance optimization, according to an example embodiment of the present disclosure. The system 110 may be implemented by way of a single device or a combination of multiple devices that are operatively connected or networked to each other. The system 110 may be implemented in hardware or a suitable combination of hardware and software. As illustrated, the system 110 may be a hardware device including a processor 120 executing machine readable program instructions to, at least one of, communicate synchronously or asynchronously with one or more software applications, databases, storage devices, or appliances operating via same or different communication protocols, formats, database schemas, platforms or any combination thereof; receive, extract, or fetch input data, e.g., historical data and/or live data; identify input parameters including Key Performance Indicators (KPIs) and initiatives operating to implement a project; determine a correlation between the KPIs and the initiatives; receive or define baseline values and target values for the input parameters; identify a relevant cluster of parameters for a KPI; forecast a future value of the KPI based on a current value thereof relative to project set-up data; predict a possibility of failure of the KPI; categorize the KPI on the prediction; recommend additional KPIs to be tracked, calculate a KPI benefit value and an initiative cost performance; calculate a net present value of an initiative related to the KPI based on the calculated KPI benefit value impacted by the initiative and the cost of implementing that initiative (or incurred cost); categorize the initiative based on the calculated net present value; provide a recommendation assisting to initiate a process to recalibrate one of the input parameters; recalibrate one of the input parameters for performance optimization; provide suggestions related to a rectifying initiative that should be undertaken to course correct based on similar past experiences captured in historical project data; evaluate an impact of the recalibration on the KPI benefit value and initiative cost performance and/or the net present value; assign a weight to the recommendation based on the evaluation; provide a weighted recommendation as an optional recommendation for a subsequent analysis of the current project or a future project; and train a classification model based on the historical data for categorizing the input parameters.

The "hardware" may comprise a combination of discrete components, an integrated circuit, an application-specific integrated circuit, a field programmable gate array, a digital signal processor 120, or other suitable hardware. The "software" may comprise one or more objects, agents, threads, lines of code, subroutines, separate software applications, two or more lines of code or other suitable software structures operating in one or more software applications or on one or more processors. The processor 120 may include, for example, microprocessors, microcomputers, microcontrollers, digital signal processors, central processing units, state machines, logic circuits, and/or any devices that manipulate data or signals based on operational instructions. Among other capabilities, the processor 120 may fetch and execute computer-readable instructions in a computer memory operationally coupled with the system 110 for performing tasks such as signal coding, data processing input/output processing, power control, and/or any other functions. In one example, the processor 120 may be coupled to a data retriever 130, a data refiner 140, and a project value predictor 150.

Figure 2:
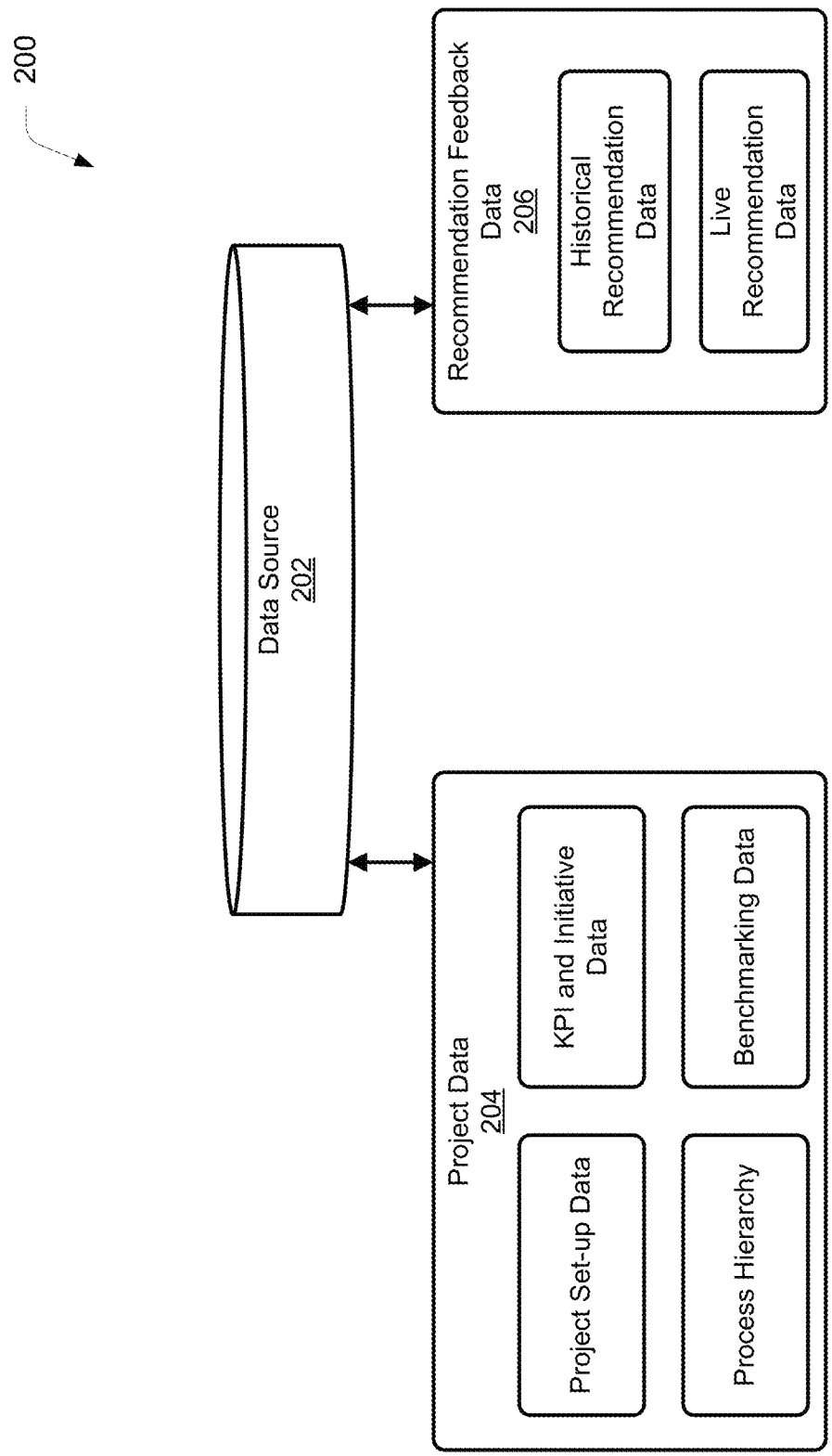
FIG. 2 illustrates data types for implementing the system of FIG. 1, according to an example of the present disclosure.

The data retriever 130 may correspond to a component for receiving input data including one or more input parameters corresponding to an active project and/or a historical project. The input parameters, and values thereof, corresponding to the active project may define live data. Similarly, the input parameters, and values thereof, corresponding to the historical project may define historical data. As illustrated in FIG. 2, the input data may include project data 204 and recommendation feedback data 206. The project data 204 may include project set-up data (e.g., project type, industry/function, a geographical indicator (e.g., region, country, etc.), location type (e.g., manufacturing facility, a retail store, etc.), project start date and project closure date), KPI data (e.g., KPI name, KPI improvement trend, KPI user inputs, KPI formulas, values and initiative(s) related to the KPI) and initiative data (e.g., implementation structure, program name, workstream name, initiative name, initiative category, initiative start date, initiative end date, initiative cost items and cost values), a process hierarchy, and benchmarking data. In the present disclosure, a "Key Performance Indicator" or "KPI" may refer to a parameter used to indicate or measure a performance of a project relative to preset metrics. The KPI and initiative data may include data related to KPIs, initiatives, costs related thereto. In the present disclosure, an "initiative" may refer to a parameter having a causal relationship with a KPI. For example, the initiative may indicate an actual activity undertaken for implementing an aspect of a project or a KPI related thereto.

In the present disclosure, a "process hierarchy" may refer to a hierarchy of processes including related categories based on an industry/function, such as sales and finance, defining preset attributes of a KPI. In the present disclosure, an "attribute" may refer to a term that qualifies or quantifies a KPI, or a feature thereof. Examples of the attribute may include, but are not limited to, an industry/function domain or category, a business industry/function domain or category, a service domain or category, a user type, a sentiment indicator, a product indicator or aspects thereof, a rating, a geographical indicator (e.g., a region, country, city, etc.), location type (e.g., manufacturing facility, retail store, etc.), and so on. In the present disclosure, a "feature" may refer to a term related to a KPI. Examples of the feature may include, but are not limited to, "IT service," "contract," "sales," "stakeholder," a timestamp, a start date, a value, an agent role or designation, emoticons or feeling indicators, a process hierarchy, KPI user inputs, a KPI formula, KPI name, an initiative and its attributes mapped to the KPI, and so on. In some instances, the attribute may also correspond to a feature, or vice versa. However, other instances may include the attribute being distinct from the feature, or a type thereof. Further, the benchmarking data may correspond to a reference value predetermined for a KPI based on historical data along with a relationship with attributes such as geographical location/indicator (e.g., region, country, city, etc.), location type, and industry/function. On the other hand, the recommendation feedback data 206 may include historical recommendation data and live recommendation data. The input data may be received from or via any suitable data source (e.g., data repository, device or component, computer readable medium, etc.) coupled to the system 110. The data retriever 130 may preprocess the input data based on a type thereof or an operational mode of the system 110 to accordingly communicate preprocessed data to suitable components of the system 110.

The project value predictor 150 may correspond to a component for receiving the preprocessed data corresponding to the live data. The project value predictor 150 may identify a historical cluster of KPIs, hereinafter also referred to as KPI cluster, that may be relevant for a KPI and forecast a future value of the KPI based on a current value thereof and/or the KPI cluster relative to a set period, such as a KPI period, or a set date. In the present disclosure, the "KPI period" may refer to a period during which a KPI may be tracked or implemented. The project value predictor 150 may also predict a possibility of failure of the KPI based on a trained classification model, categorize the KPI based on the prediction, and calculate financial benefits from the KPI (or the KPI benefit value). In the present disclosure, the "benefit value" may refer to a revenue gain, cost savings, working capital optimization or any other financial metric based on a change in KPI, or a value related thereto, from a baseline value or a known target value during the KPI period. The project value predictor 150 may also calculate the expected costs to be incurred during the implementation of an initiative. The project value predictor 150 may further calculate the net present value of an initiative related to the KPI based on the calculated KPI benefit value indicative of initiative-level benefits, and categorize the initiative based on the calculated net present value. In the present disclosure, a "net present value" may refer to a discounted cost value of an initiative based on a difference between the KPI benefit value and an incurred cost of implementing the initiative. Accordingly, the "net present value" may also be defined as a sum of initiative-level benefits less initiative-level costs. Calculation of both the KPI benefit value and the net present value are discussed below in greater detail. Further, the project value predictor 150 may provide a notification or a recommendation to assist in initiating a recalibration process based on both the KPI and the initiative being categorized as failure, recalibrate one of the input parameters for optimizing the KPI performance, provide suggestions related to a rectifying initiative that should be undertaken to course correct based on the historical data, evaluate an impact of the recalibration on the KPI, KPI benefit value, initiative cost performance and/or the net present value, assign a weight to the recommendation based on the evaluation, and store and provide the weighted recommendation forming the recommendation feedback data 206 for a subsequent recalibration. In some examples, the project value predictor 150 may also activate, or operate with, another component to perform the recalibration process. In the present disclosure, "KPI performance" may be defined as a change in a value related to a KPI during or after a set period such as KPI period, project period, or an interval related thereto.

The data refiner 140 may correspond to a component for training one or more predefined data models based on the preprocessed input data, such as the historical data. For example, the data refiner 140 may train a statistical data model for calculating a future value of the KPI and a classification model to predict the possibility of failure of the KPI for categorization. In some embodiments, the data refiner 140 may employ a combination of different types of data models for providing a consolidated or combinational trained data model. The data refiner 140 may also train another suitable data model to provide a third trained model for recommending one or more relevant KPIs that may be selected or tracked based on the input data such as a project type and an expected outcome (e.g., a KPI benefit value greater than a threshold or predefined target KPI benefit value). The third trained model may include a classification model, a statistical model, or a combination thereof.

Figure 3:
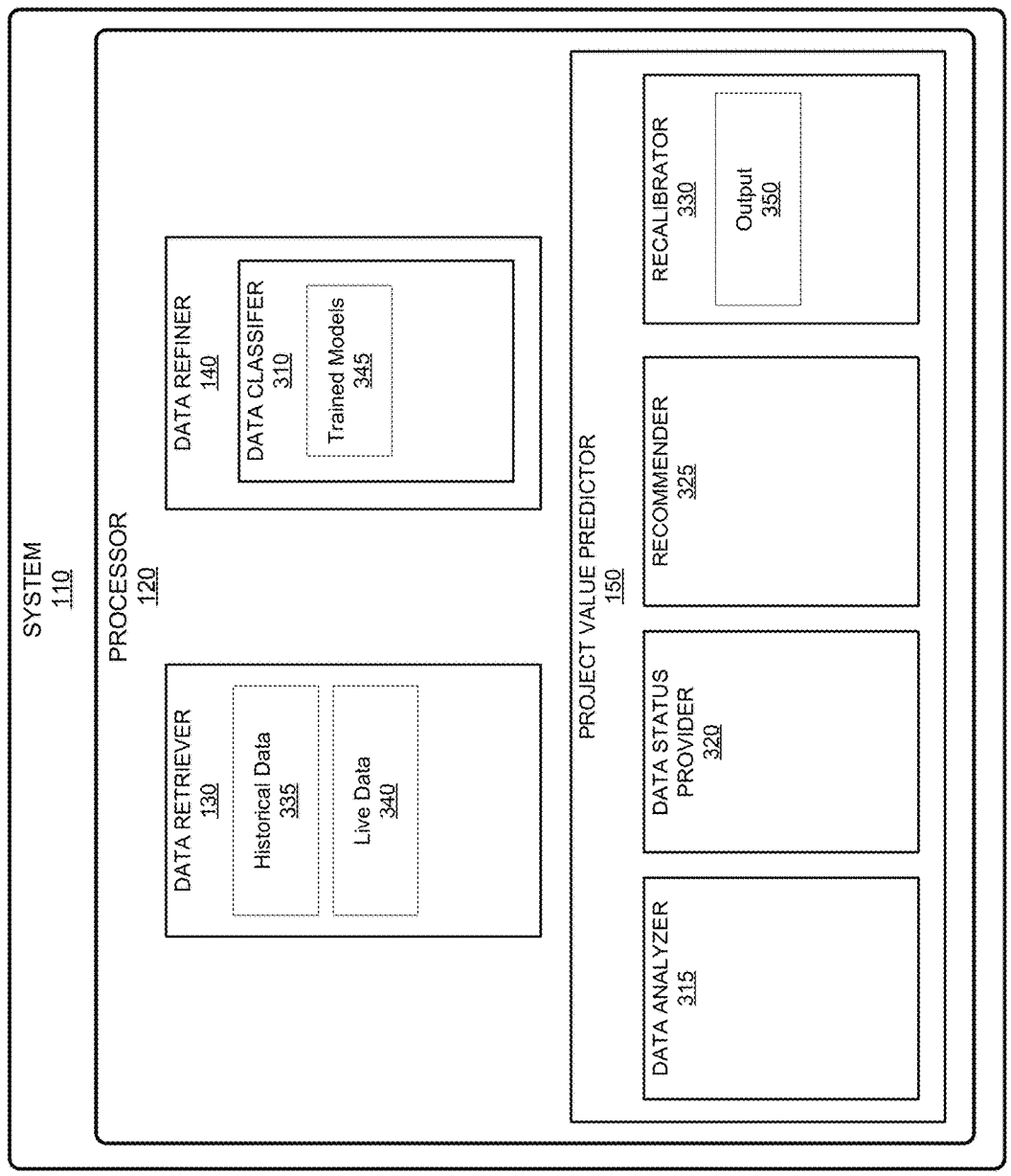
FIG. 3 illustrates components of the system of FIG. 1, according to an example embodiment of the present disclosure.
Figure 4:
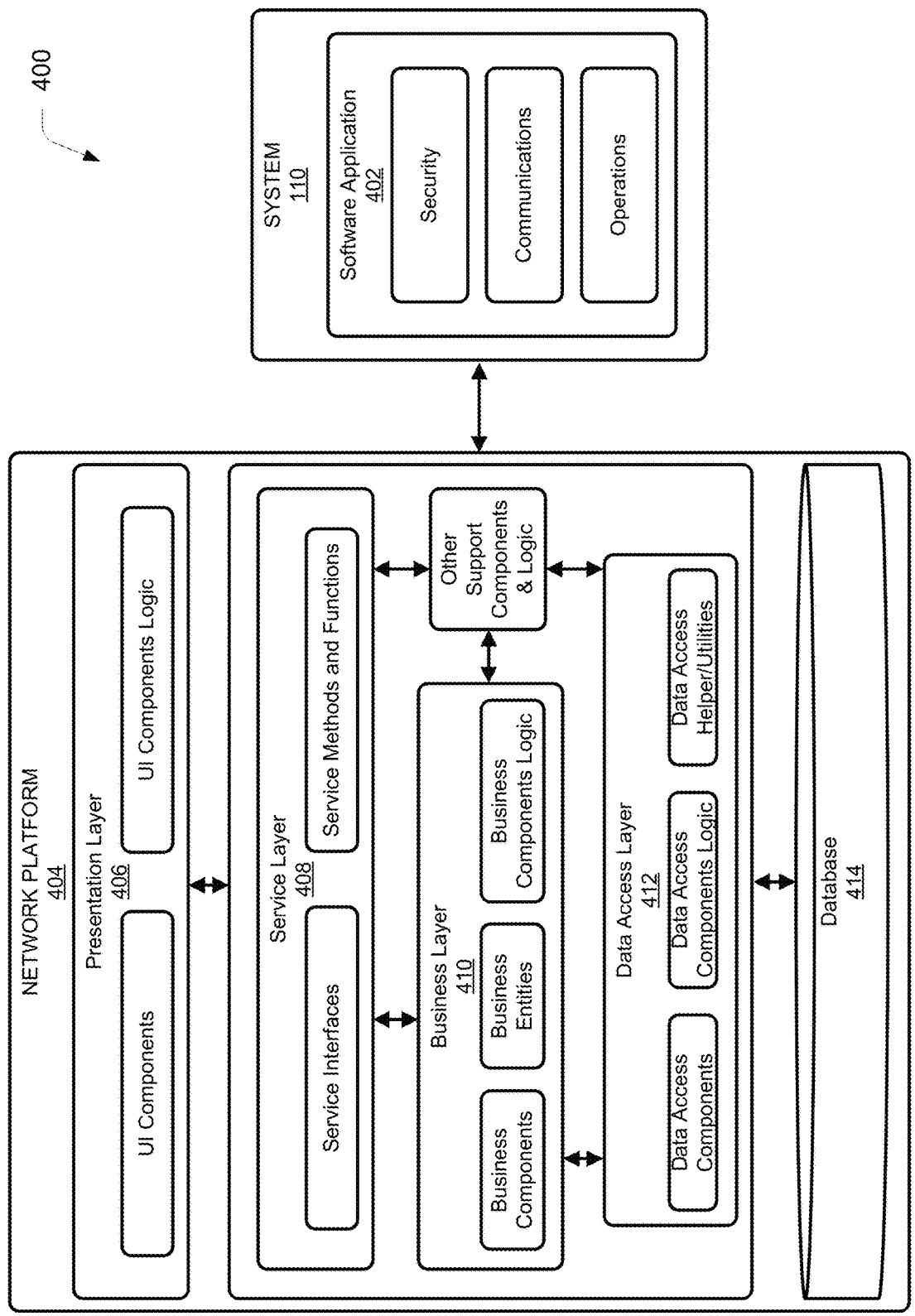
FIG. 4 illustrates a network environment for implementing the system of FIG. 1, according to an example of the present disclosure.

FIG. 3 illustrates components of the system 110 of FIG. 1, according to an example embodiment of the present disclosure. The system 110 may include one or more components that may predict a project benefit value indicating a possibility of project failure based on a combination of KPIs and related initiatives implemented during a KPI period relative to a project closure date and accordingly initiate a recalibration process for dynamic cost and performance optimization. For example, the system 110 may include the processor 120 coupled to one or more components such as the data retriever 130, the data refiner 140, and the project value predictor 150 including a data analyzer 315, a data status provider 320, a recommender 325, and a recalibrator 330. The system 110 may include, wholly or in part, a software application working alone or in conjunction with one or more hardware resources. For example, as illustrated in FIG. 4, the system 110 may be implemented as a software product including a software application 402 operating to perform a variety of tasks. In one embodiment, a "software product" may refer to a computer code implemented on a computer readable medium operating to perform one or more aspects of the system 110 discussed in the present disclosure. In some examples, the software product may include one of an operating system, an Internet browser, a computer application, and a device driver. In some other examples, the software product may include a software patch capable of modifying or assisting in implementing an aspect (e.g., installation, uninstallation, synchronization, general operation, etc.) of the software product. In the preset disclosure, a "software patch" may refer to a computer code that may be an incomplete version of the software product or designed to operate, or cease to operate, in combination with the software product. In some examples, the software patch may cause an operating task or a component to wholly or in part cease to operate.

In one embodiment, the software application 402 may be implemented to run with any of a variety of network platforms, such as a network platform 404 including a presentation layer 406, a service layer 408, business layer 410, and a data access layer 412. The network platform 404 may be implemented as a client device or a host device in a client-server architecture. The service layer 408 may include various non-user interface (non-UI) computer applications called as computers services (e.g., service interfaces and service logic methods and functions) running in the background to manage various operations of the network platform 404. The service layer 408 may communicate with the presentation layer 406 including software logical blocks (e.g., UI components and UI components logic) via suitable web application programming interfaces (APIs) such as those developed using C# and .Net Core technologies. The presentation layer 406 may handle communications with external devices or applications such as the software application 402 and can be implemented using any suitable technology (e.g., HTML, CSS3, Angular, etc.) compatible with that of the service layer 408. Further, the service layer 408 may communicate with the business layer 410 including software logical blocks (e.g., business components, business entities, business components logic) handling and managing corporate data (e.g., project data 204, recommendation feedback data 206, customer data, vendor data, etc.) of a business. The business layer 410 may communicate the corporate data to a suitable database such as a database 414 for storage via the data access layer 412 including logical blocks, for example, data access components, data access components logic, data access helper/utilities, etc.) operating to handle such data communication. One example of the database 414 may include Mongo DB™ designed for transactional stores; however, a skilled artisan may contemplate any other suitable types of databases. The Mongo DB™ may enable a quick access of a large amount of unstructured data (e.g., corporate data) stored therein and assist to reduce costs upon use with the software product implemented as an open-source platform and a suitable operating system such as Linux OS™. The software application 402 may communicate with any layer of the network platform 404 using compatible APIs. Accordingly, the software product may assist to segregate data received from different network platforms and be hosted on a private network platform such as the network platform 404 (e.g., an internal corporate cloud platform) for keeping the related data private while being platform independent.

The software application 402 may also operate to support or enhance the functionality and/or capacity of a network to which it may be connected. The software application 402 may implement system tasks via supported or compatible technologies. For instance, the software application 402 may perform communication tasks such as handling e-mails (for example, via Gmail™, MS Outlook™, etc.), security tasks such as providing secure access to authorized parties (for example, via Azure Active Directory (Azure AD™), Secure Sockets Layer (SSL™), etc.), operational tasks such as handling files or documents (for example, via MS Excel™, MS Word™, Adobe Acrobat™ Reader, etc.) and any other tasks including network management tasks including IP address management. In some other embodiments, the software application 402 may be further configured to expose its computing environment or operating code to a user, and may include related art I/O devices, such as a keyboard or display. The software application 402 of some embodiments may, however, include or access software, firmware, or other resources that support the remote administration and/or maintenance of the system 110.

The software application 402 or the software product may be executed by a processor such as the processor 120, dedicatedly or in communication with different hardware platforms, or emulated in a virtual environment. Aspects of the system 110 may also leverage known, related art, or later developed off-the-shelf software. Other embodiments may comprise the system 110 being in communication with a mobile switching center, network gateway system, Internet access node, application server, IMS core, service node, or any other type of communication systems, including any combinations thereof. In some embodiments, the system 110 may be implemented, wholly or in part, as a movable device, wearable device, or a portable device. One having ordinary skill in the art would understand that the system 110 and/or the components described herein are examples and that similar or additional systems and/or components may be employed for performing the functionalities related thereto described in the present disclosure. The components are discussed in conjunction with an architecture 500 for the system 110 illustrated in FIG. 5. The architecture 500 provides a workflow for the components during operation. However, any other suitable architecture 500 may be contemplated based on the embodiments and concepts described in the present disclosure. It will also be appreciated that one or more of the components may operate in communication with each other irrespective of the workflow as illustrated, or otherwise, for performing any of the operations discussed herein.

In an embodiment, the data retriever 130 may be installed, integrated, or operatively associated with a user device (not shown) including any suitable computing device such as a desktop PC, a personal digital assistant (PDA), a server, a mainframe computer, a mobile computing device (e.g., mobile phones, laptops, etc.), an internet appliance (e.g., a DSL modem, a wireless access point, a router, a base station, a gateway, etc.), and so on. In some instances, the data retriever 130 may operate, or cease to operate, in response to a wearable or portable device including, but not limited to, a fashion accessory (e.g., a wrist band, a ring, etc.), a utility device (e.g., hand-held baton, a pen, an umbrella, a watch, an access card, etc.), a body clothing, or any combination thereof, present proximate, or remotely connected to, the data retriever 130 or the user device.

The data retriever 130 either in communication with any of the network devices such as the computing device or the processor 120, or dedicatedly, may have video, voice, or data communication capabilities (e.g., unified communication capabilities) by being coupled to or including a display device, or any other types of hardware, in any combination thereof. In some embodiments, the data retriever 130 may comprise or implement various real time protocols and non-real-time protocols known in the art, related art, or developed later to facilitate data transfer among the user device, the processor 120, or any other network devices such as a server (not shown). Further, the data retriever 130 may convert communications, which may include instructions, queries, data, files, etc., received from a client device implementing the network platform 404 and/or the user device into appropriate formats to make such communications compatible with the network devices, and vice versa, and/or readable by a user. Consequently, the data retriever 130 may allow implementation of the network devices using different technologies or by different organizations, such as a third-party vendor, managing the server or associated services based on a proprietary technology.

The data retriever 130 may receive the input data corresponding to the live data 340 or the historical data 335 via any suitable interface(s), data repository, and/or components, such as the user device and the client device, coupled to the system 110 over a network (not shown). The interface(s) may include software interfaces (e.g., an application programming interface, a graphical user interface, etc.); hardware interfaces (e.g., cable connectors, a keyboard, a card reader, a barcode reader, a biometric scanner, an interactive display screen, sensors, etc.); or both. Such interface(s) may facilitate communication between various components and networked devices coupled to the system 110. Further, the data repository may include any suitable type of computer memory or data storing system known in the art including, but not limited to, a Structured Query Language (SQL) database or any other suitable database such as Mongo DB™, a file system, a non-SQL database, a streaming application programming interface (API), and a cloud system. The network may include any software, hardware, or computer applications capable of providing a medium to exchange signals or data in any format known in the art, related art, or developed later. The network may include, but is not limited to, a website, a social media platform, a unified communication application, and a stand-alone application. Examples of the social media platform may include, but are not limited to, Twitter™, Facebook™, Skype™, Microsoft Lync™, Cisco Webex™, and Google Hangouts™. Further, the network may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (xDSL)), Wi-Fi, radio, television, cable, satellite, and/or any other delivery or tunneling mechanism for carrying data. The network may include multiple networks or sub-networks, each of which may include, e.g., a wired or wireless data pathway. The network may include a circuit-switched voice network, a packet-switched data network, or any other network configurable to carry electronic communications. For example, the network may include networks based on the Internet protocol (IP) or asynchronous transfer mode (ATM), and may support voice using, for example, VoIP, Voice-over-ATM, or other comparable protocols used for voice, video, and data communications.

Further, the system 110 may operate one or more components coupled thereto based on predefined or dynamically defined modes controlled by the processor 120; however, these modes may be manipulated or selected from any of the components or network devices coupled to the processor 120. For example, a desired mode may be selected from the data retriever 130; however, other components, such as a user device, a client device, and a server, coupled to the processor 120 may also be contemplated to select the desired mode. In one embodiment, the system 110 may operate in a training mode and a live mode. In the training mode, the processor 120 may communicate the historical data 335 to the data refiner 140 for processing. In some embodiments, the project value predictor 150, or a component thereof, may be deactivated during the training mode. Similarly, in the live mode, the processor 120 may communicate the live data 340 to the project value predictor 150 for processing. In some embodiments, the data refiner 140 may be deactivated during the live mode. Other embodiments may include additional modes, for example, a testing mode that may be selected or controlled from a component such as the data retriever 130 to operate or activate the project value predictor 150 as well as the data refiner 140 simultaneously for processing different types of input data, for example, the historical data 335 and/or the live data 340. In further embodiments, the system 110 may operate in one of preset or dynamically set communication modes in tandem with such operational modes, i.e., the training mode, the live mode, and/or the testing mode. In one example, the communication modes may include a push mode and a pull mode. In the push mode, the system 110 may operate to dynamically provide an indication or data to an output device 725 or various components coupled thereto. On the other hand, in the pull mode, such output device 725 or various components coupled to the system 110 may dynamically initiate a sequential or parallel communication among each other for obtaining or providing an intended indication or data. Examples of such indication may include numeric indications, alphanumeric indications, or non-alphanumeric indications such as vibrations, sounds, colors, luminance, patterns, textures, graphical objects, etc. perceivable through tangible indicators (e.g., light emitting diodes, vibrators, speakers, display device, etc.) or displayable on the software interface(s), such as a dashboard on the display device, or any other suitable types of audio, visual, and haptic indications known in the art, related art, or developed later.

During the training mode, the data retriever 130 may receive the input data such as the historical data 335 corresponding a historical project from the data source. The historical data 335 may include the project data 204 having the project set-up data, the process hierarchy, the KPI and initiative data, and the benchmarking data related to the historical project. The project set-up data may include a project type, industry/function, a geographical indicator (e.g., region, country, etc.), location type (e.g., manufacturing unit, retail store, etc.), a project start date, a project closure date, and a period extending therebetween defining an operational duration (or project period) of such project. The KPI data may include KPI name, KPI improvement trend, KPI user inputs (e.g., values and additional parameters related to a KPI), KPI formulas, KPI values (e.g., current KPI values, target KPI values, cumulative values, etc. at various intervals during the project period, and initiative(s) related to the KPI. In some instances, the "KPI improvement trend" may refer or relate to a data label implying a desired direction such as positive/negative and high/low for a KPI over a predefined period or an interval related thereto. The initiative data may include an implementation structure, program name, workstream name, initiative name, initiative category, initiative start date, initiative end date, initiative cost items, and costs incurred and a target net present value at various intervals during a predefined period such as the KPI period and the project period. In the present disclosure, a "historical project" may refer to a project associated with a project start date prior to the current date. In some instances, the historical project may have ended or closed before a start date/time of an active or intended project; however, other instances may comprise the historical project including an ongoing project. In one embodiment, the KPI data may include a set of KPI clusters. Each KPI cluster may be a collection of one or more KPIs having common or shared attributes or features. In some examples, the KPI cluster may include the KPIs having a majority of attributes and/or features being same or similar. Each KPI cluster may be associated a cluster target value. In the present disclosure, a "cluster target value" may refer to a common or average target value associated with a KPI cluster. The cluster target value may be preset based on a predefined business function. For example, a KPI cluster may include a set of KPIs such as "no. of new customers invoiced in a quarter" and "no. of new customers acquired in a quarter" related to sales and have "25" as a cluster target value. In some instances, the data retriever 130 may dynamically define or modify the cluster target value based on an average of individual target values of the KPIs related to the KPI cluster. In some other instances, the cluster target value may be predefined or dynamically defined being equal to a lowest target value associated with a KPI in the KPI cluster. In yet another instance, the cluster target value may be predefined or dynamically defined equal to a highest target value associated with a KPI in the KPI cluster. In still another instance, the cluster target value may be predefined or dynamically defined relative to (i) a threshold value related to a specific KPI or (ii) an average of multiple threshold values associated with the KPIs within the KPI cluster. In further examples, the cluster target value may be used as a KPI benchmark value for the KPIs related to corresponding KPI cluster. However, other examples may include the benchmarking data providing a preset benchmark value (hereinafter referred to as KPI benchmark value) for each KPI or KPI cluster. In other examples, the KPI benchmark value may be provided by a user. In still other examples, at least one of the KPIs in the KPI cluster and/or the KPI cluster itself may be associated with a predetermined KPI benefit value, which may be used as a target KPI benefit value.

In another embodiment, the KPI data may include the set of the KPIs, instead of the KPI clusters, in the historical data 335. The data retriever 130 may operate on the received set of KPIs to create the KPI cluster(s). For example, the data retriever 130 may extract features (including attributes) from each of the KPIs using any of the feature extraction techniques known in the art. The extracted features may be analyzed by the data retriever 130 using any suitable unsupervised learning techniques known in the art. For example, the data retriever 130 may implement a statistical dimension reduction model, such as a principal component analysis (PCA) model providing a linear transformation, to adjust a number of attributes related to the KPIs, thereby representing the KPIs with a different, or reduced, number of attributes or data dimensions. In the present disclosure, a "data dimension" may refer to a type or category of data having a common or majority attribute corresponding to the KPIs such as industry/function, a geographical indicator (e.g., region, countryetc.), a location type (e.g., manufacturing unit, retail store, etc.), process hierarchy, formulas, and initiatives mapped to the KPIs. Such reduced data dimension may assist to establish KPI clusters that may be most representative of a group of one or more KPIs and identify which features may be influential and which may be not during the live mode. The data retriever 130 may group together the group of KPIs having a majority of attributes, or features, being similar or same to create one or more KPI clusters. For each of the attributes, and features related thereto, the data retriever 130 may, for example, (i) adjust for skewed data for eliminating any outliers, for example, based on log-transformation techniques or any other suitable techniques, to obtain a log-normal or near normal distribution of such attributes and features, (ii) perform binning of numerical attributes, or features, per mapping to reduce data complexity and normalization, (iii) obtain numerical representations of the categorical attributes, for example, based on dummy encoding or one-hot encoding techniques, for statistical analysis, (iv) normalize the natural language text, for example, based on sentence tokenization, word tokenization, lemmatization, stemming, stop word removal, spellcheck, special character removal, and part-of-speech (POS) tagging, or any other suitable techniques, to remove portions such as spacings and redundancies irrelevant for analysis, and/or (v) normalize the attributes using data sufficiency and accuracy threshold techniques known in the art. The data retriever 130 may subsequently define a cluster target value for each of the created KPI clusters as discussed above.

Further, the KPI data may also include a KPI period associated with each KPI in the KPI clusters. The KPI period may indicate a total duration for which the KPI may be implemented for the historical or ongoing projects. The KPI period may include one or more intervals along with timestamps. The KPI period may start from the project start date and may continue until a project closure date of the corresponding project. However, in some examples, the KPI period may be shorter than the project period. Further, in the historical data 335, each KPI may be associated with an outcome category or label indicating an impact of such KPI on the corresponding historical project. For example, the KPI cluster may include a KPI being associated a "success" category or a "failure" category. In one example, the "success" category—may indicate that the actual KPI values and the related KPI benefit value for the project met or exceeded a predefined or threshold target value, or a historical KPI benefit value associated with the same KPI in a relevant KPI cluster. Similarly, the "failure" category may indicate that the KPI value and the related KPI benefit value for the project is less than or equal to a predefined or threshold target value, or a historical KPI benefit value associated with the same KPI in a relevant KPI cluster. In some examples, such predefined or threshold target values may be set for scheduled intervals (daily, monthly, quarterly, etc.) corresponding to the project closure date of the historical project.

In an embodiment, the historical data 335 may also include historical recommendation data including a set of one or more historical recommendations. Each such historical recommendation may relate to a specific input parameter, or values thereof, which may have yielded an intended outcome, such as the KPI benefit value and initiative cost performance being equal to or greater than a corresponding target value, for the historical project. In some examples, the historical data 335 may also include a live recommendation data corresponding to an active project and provided as feedback to the data retriever 130. The recommendations may indicate a suggestive change to corresponding input parameters related to an active project. Examples of the recommendations may include, but are not limited to, additional initiatives that should be taken to improve KPI performance, a change in project closure date, a change in KPI period or project period, changing a KPI or a combination of KPIs, and changing an initiative or a combination of initiatives, or values related thereto. In some examples, the historical recommendations may be associated with weights based on a status of or an increase in the outcome correspondingly achieved therethrough, discussed below in further detail. The data retriever 130 may send the historical data 335 to the data refiner 140 for processing.

The data refiner 140 may receive the historical data 335 as training data from the data retriever 130. The data refiner 140 may be coupled to a data classifier 310 corresponding to a component for training one or more data models using suitable supervised learning techniques known in the art. For example, the data refiner 140 or the data classifier 310 may train a first data model for forecasting a future value of a KPI during the live mode. In one instance, the first data model may be a statistical data model such as a multivariate regression model being trained based on the attributes and/or features of KPIs in the historical data 335, which may be used to identify the key influencing factors (e.g., KPI attributes/features including initiatives related thereto) impacting a KPI and forecast the values based on those influencing factors. In another example, the data refiner 140 or the data classifier 310 may additionally train a second data model for predicting a possibility of failure of a KPI received during the live mode and accordingly categorize the corresponding KPI. The data classifier 310 may train the second data model such as a classification model based on the training data including a list of KPIs associated with a set label indicating failure or success in meeting or exceeding the expected target values in the historical project. The expected target values may refer to a predefined or threshold KPI target value or a target benefit value. The classification model may be implemented as any suitable classification model known in the art, related art, or developed later. In an example, the classification model may be implemented as a statistical classification model such as a Support Vector Machine (SVM) model with a kernel corresponding to Radial Bias Function (RBF). Other examples may include a suitable combination of the statistical classification model and a probabilistic classification model known in the art, related art, or developed later. In still another example, the data refiner 140 or data classifier 310 may also train a third data model for recommending one or more relevant KPIs that may be selected or tracked based on the input data such as a project type and expected outcomes (e.g., process automation, process standardization, cost reduction, customer experience improvement, revenue enhancement, working capital optimization etc.). In one instance, the third data model may be any suitable classification data model known in the art. The classification model may be trained based on recommendations related to selected one or more KPIs in the KPI clusters. Each of the selected KPIs may be associated with multiple set labels during the respective project periods in the training data or historical data 335. In one example, the set labels may include at least one label indicating "failure" and a most recent label indicating "success" in the historical data 335.

Accordingly, the data classifier 310 may train the first data model (e.g., multivariate regression model), the second data model (e.g., SVM model), and the third data model (e.g., SVM model) based on the features of the KPIs in the KPI clusters and the corresponding outcome categories/labels (e.g., success, failure, etc.) related thereto to provide trained data models for use during the live mode. The trained data models may be sent to the project value predictor 150 by the data classifier 310, or stored in the data repository such as the database 414 for access by the project value predictor 150 or any other component operationally coupled to the system 110.

Figure 5:
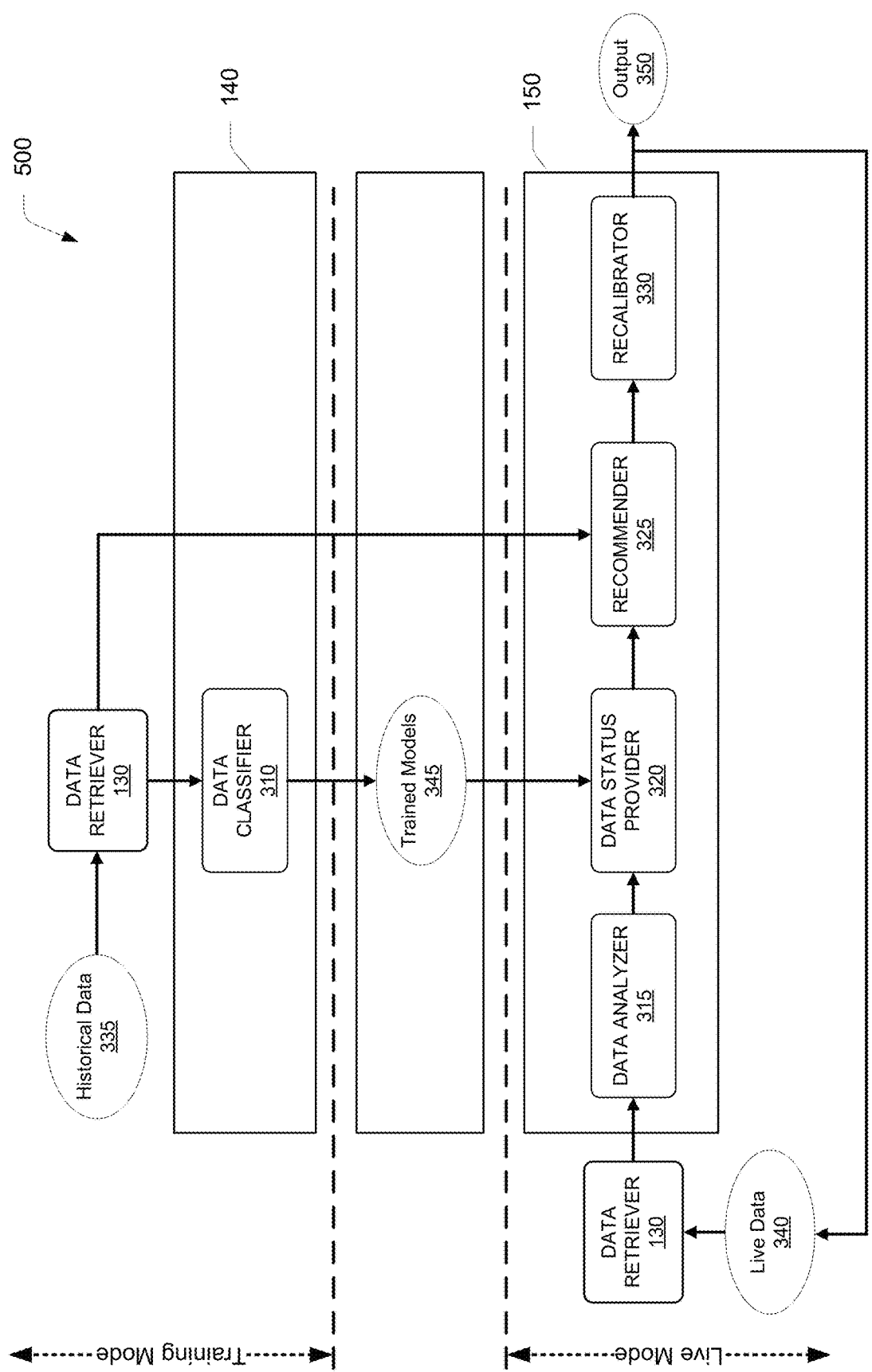
FIG. 5 illustrates a flow architecture for the system of FIG. 1, according to an example embodiment of the present disclosure.

As illustrated in FIG. 5, the data retriever 130 may receive the input data such as the live data 340 during the live mode from a data source or dynamically from a user. The live data 340 may include the project data 204 having the project set-up data, the process hierarchy, the KPI and initiative data, and the benchmarking data related to an active project. In the present disclosure, an "active project" may refer to a project associated with a project closure date after the current date. The project set-up data may include a project type, industry/function, a geographical indicator (e.g., region, country, etc.), location type (e.g., manufacturing unit, retail store, etc.), a project start date, a project closure date, and a project period for such project. For example, as illustrated in FIG. 6A, the data retriever 130 may receive stakeholders, indicated under "name," associated with the active project via a dashboard of the system 110. The stakeholders may be preselected based on the project type or the project start date, or dynamically selected by a user. Each stakeholder may a preselected or dynamically set "access level," for example, "owner," supervisor, client, etc. In the present disclosure, "stakeholder" may refer to an entity (e.g., person, device, or AI system) having authorization or responsible for implementing or managing a KPI or an initiative related to a project such as an active project.

Further, the data retriever 130 may receive categories or attributes for the project. In some instances, the categories or the attributes may be set based on a business function such as sales, finance, manufacturing, etc. For example, as illustrated in FIG. 6B, the data retriever 130 may receive attributes, e.g., "Functions", process hierarchy—"L1," "L2," "L3," "Business unit," "Sub-business unit," "Region," "Country," and "Location" via the dashboard of the system 110. The data retriever 130 may also have an intended order of these attributes defining the hierarchy illustrated as "Level 01 Functions," "Level 02 Business unit," and "Level 03 Geography."

Figure 6C:
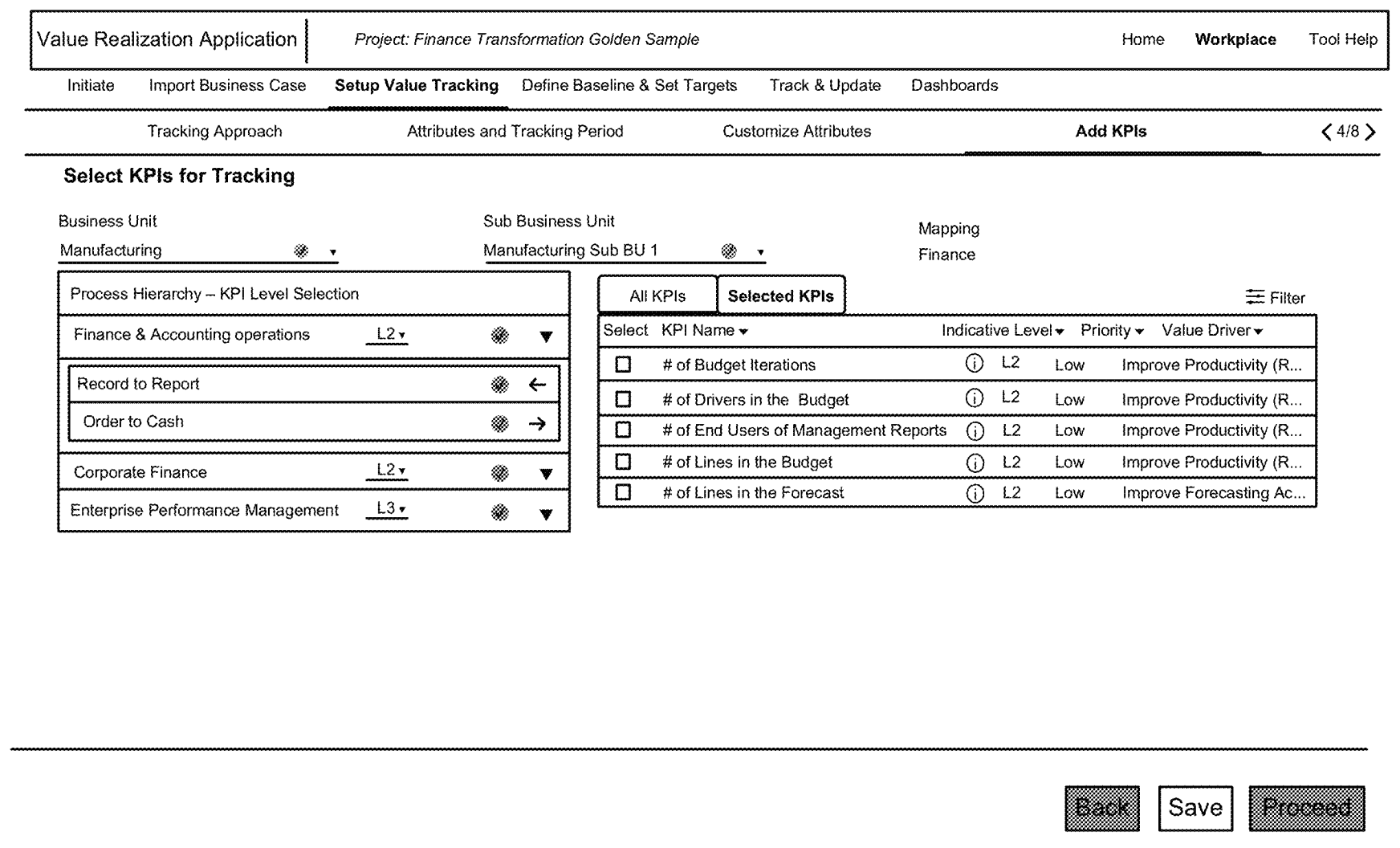

The data retriever 130 may also receive the KPI and initiative data related to the project. The KPI data may include KPI name, KPI improvement trend, KPI user inputs (e.g., values and additional parameters related to a KPI), KPI formulas, start date, end date, KPI values at various intervals therebetween and initiative(s) impacting the KPI. For example, as illustrated in FIG. 6B, the data retriever 130 may receive the KPI period indicated by "Tracking Period," the KPI start date indicated by "Start date" and the KPI end date indicated by "End date" preselected or dynamically selected by a user via the dashboard of the system 110. The KPI data may also include one or more KPIs and related initiative data including a set of one or more initiatives, an initiative start date, an initiative end date, and a period extending therebetween defining an initiative period during which an initiative may be tracked or implemented. For example, as illustrated in FIG. 6C, the data retriever 130 may receive the KPIs indicated by "KPI name," preselected or dynamically selected from a list of available KPIs indicated by "All KPIs" for each level or category, e.g., indicated by "Manufacturing" and "Manufacturing Sub BU1" of the process hierarchy via the dashboard of the system 110. KPIs may be preselected by the data retriever 130 based on the KPI clusters or the historical data, for example, considering project details such as project type, industry/function, geographical indicator (e.g., region, country, etc.) and location type. Further as illustrated in FIG. 6D, the data retriever 130 may receive the initiatives, indicated under "New Initiative" related to the each KPI, as well as the related category indicated under "Category," the initiative start date indicated by "Start date," and the initiative end date indicated by "End date" that may be preselected or dynamically selected by a user via the dashboard of the system 110. In some examples, the data receiver may also assist to map the received stakeholders to each of the selected initiatives and the KPIs. For instance, as illustrated in FIG. 6E, the data receiver may receive stakeholders indicated under "Name" under the "Map Initiative Owners" for each of the previously set initiatives that may be preselected or dynamically selected via the dashboard of the system 110. The list of initiatives may be preselected by the data retriever 130 based on the corresponding KPIs being selected and the historical data, for example, considering project details such as project type, industry/function, geographical indicator (e.g., region, country, etc.) location.

The KPI data may further include a baseline KPI value, an end-state target KPI value, a period-wise KPI target value, a period-wise KPI benefit value (financial impact of the KPI) and a period-wise KPI actual value and a benefit value for each of the KPIs at one or more intervals during the KPI period. For example, as illustrated in FIG. 6F, for a set KPI indicated by "% of Supplier Invoices Submitted Electronically," the baseline KPI value may be set as indicated under "As-Is Value," the end-state target KPI value may be set as indicated under "To-be Value," the period-wise KPI target value may be set as indicated in the row "KPI value," and the KPI benefit value may be indicated by in the row "Benefit value" at different intervals set as indicated by "Sep/2018," "Oct/2018," "Nov/2018," "Dec/2018," "Jan/2019," and "Feb/2019." Various variables defining or implementing the KPI may be indicated under "User Input." In some instances, the end-state target KPI value may be recommended by the recommender 325 based on the benchmark data available from historical data. Based on the project type, duration (e.g., a period extending between project start and end dates), industry/function, geographical indicator (e.g., region, country, etc.) and location type, a typical KPI improvement trend may be estimated by the data status provider 320 based on which an end-state target KPI value could be recommended, as discussed below.

KPIs in a project may be linked to the initiative(s). Implementation of initiative(s) (cause) may impact the KPI value and KPI benefit value (effect). KPI and initiative(s) may have a many-to-many relationship, where, if multiple initiatives are impacting a KPI, then a change in KPI value in a period and the resultant KPI benefit in that period may be proportionally allocated to all the initiatives. The KPI benefit value may be used for calculating the benefits by initiatives, by allocating KPI benefit value in a period into the linked initiative(s) in a predetermined proportion as mentioned previously. This provides a view of benefits (or KPI benefits) by initiatives. The other aspect then is to consider the cost of implementation of initiatives. Hence, the initiative data may also include a total allotted cost and a target or maximum cost value for each of the initiatives at one or more intervals during the initiative period. For example, as illustrated in FIG. 6G, for a set initiative indicated by "Integrate tax data and reporting requirements into financial systems," the total allotted cost may be indicated in the row "Total Cost," and the target cost value under different intervals indicated by "Sep/2018," "Oct/2018," "Nov/2018," "Dec/2018," "Jan/2019," and "Feb/2019." Various cost items defining or implementing the initiative may be indicated under "User Input" such as license, hardware, maintenance and support, training, and other preselected or dynamically defined cost items. The cost items may also be classified as "capex" or "opex" indicating whether they are of the nature capital expenditure or operational expenditure respectively. The cost items and their values may be recommended on the basis of project type, duration (e.g., period between project start and end dates), industry/function, geographical indicator (e.g., region, country, etc.) and location type. Based on the recommendation or dynamic input, the total cost for each of these variables may be preset based on the historical data 335 or dynamically set via the dashboard of the system 110 as indicated under "Total Values" in FIG. 6G. The total values are then broken down into period-specific costs as indicated by "Sep/2018," "Oct/2018," "Nov/2018," "Dec/2018," "Jan/2019," and "Feb/2019."

Further, the data retriever 130 may receive the actual KPI data (current KPI values) and actual initiative data (actual or incurred cost values) for one or more intervals till date during the corresponding KPI period and initiative period. For example, as illustrated in FIG. 6H, the current KPI values may be received as indicated by the second last row including "Actual", the forecasted KPI values is based on multivariate forecasting mentioned previously and indicated as "Forecast" be received under different intervals indicated by "Sep/2018," "Oct/2018," "Nov/2018," "Dec/2018," "Jan/2019," and "Feb/2019." The actual KPI data is dynamically taken through an automated connection with source systems, which may include both ERP and/or non-ERP systems such as database 414. Similarly, as illustrated in FIG. 6I, the current initiative cost values may be received as indicated by the second last row including "Actual" under different intervals indicated by "Sep/2018," "Oct/2018," "Nov/2018," "Dec/2018," "Jan/2019," and "Feb/2019."

The data retriever 130 may send the received input data, i.e., the live data 340, to the data analyzer 315 for processing. The data analyzer 315 may correspond to a component for identifying a relevant KPI cluster for each KPI received in the live data 340 based on the historical data 335. The data analyzer 315 may identify features of the KPI based on any suitable feature identification models known in the art. The identified features may be compared with those of each of the KPI clusters in the historical data 335. These features may relate to the attributes (e.g., industry or function, region, country, location, location type, etc.), the received process hierarchy, variable defining or implementing the KPI, such as "User Inputs" discussed above, as well as any set formulas, names, or flags associated with KPI names. The features may further relate to the initiatives mapped to the KPI. Based on the features, the KPI cluster including a majority number of attributes/features associated with the KPI may be identified as relevant for that KPI by the data analyzer 315. For example, the data analyzer 315 may assist to adjust a target KPI value associated with the KPI based on a cluster target value of the relevant KPI cluster. Moreover, the relevant KPI cluster may indicate that the underlying attributes or features as the influencing factors for the KPI. The data analyzer 315 may provide the identified related values of the relevant KPI cluster and the KPI to the data status provider 320.

The data status provider 320 may correspond to a component for forecasting a future value of the KPI, predict a possibility of failure of the KPI, categorize the KPI based on the prediction, calculate KPI benefit value for the KPI, calculate a net present value of an initiative related to the KPI, categorize the initiative based on the calculated net present value. In some instances, the data status provider 320 may forecast the future value of the KPI using the current value of the KPI. In one example, the data status provider 320 may access the a first trained data model such as the first trained data model 345-1 (e.g., trained multivariate regression model) to forecast the future value. In another example, the data status provider 320 may use the influencing factors, or key attributes and features, of the identified relevant KPI cluster to train a new data model or retrain the first trained data model 345-1, such as the multivariate regression model. The data status provider 320 may use the first trained data model 345-1 to forecast the future value of the KPI. The future value may be forecasted for the future intervals and at end of the KPI period or the project closure date. In some instances, the forecasted value may be a cumulative value of KPI values at different predefined intervals during an intended period such as the KPI period. In one example, the forecasted future value may be a known value of the same KPI in the relevant KPI cluster after a duration equivalent to an intended period such the KPI period, the project period, or an interval related thereto. In another example, the data status provider 320 may forecast the future value based on a set formula. For example, for a finance function or workstream, a KPI formula may be represented as shown in Equation 1.

$$\text{KPI formula}=A/(B/C) \quad (1)$$

Where:
A=Current accounts receivable
B=Current Revenue
C=number of days in an interval Further, the data status provider 320 may predict a possibility of failure of the KPI based on the historical data 335 to pre-classify the KPI. The data status provider 320 may predict the possibility of failure using the second trained data model 345-2 based on a comparison between attributes/features of the KPI and those of a list of KPIs associated with a "failed" category in the historical data 335. Upon comparison, the data status provider 320 may pre-classify the KPI as failure based on the KPI belonging or similar to any KPI that has been labelled as failure in the list.

Subsequently, the data status provider 320 may categorize the KPI into a set category, for example, namely "success" and "failure" based on one of the future value and the pre-classification of the KPI. For instance, the data status provider 320 may categorize the KPI as failure based on at least the future KPI value being less than the target KPI value at the end of the KPI period or at the project closure date. Else, the data status provider 320 may categorize the KPI as success. In another example, the data status provider 320 may categorize the KPI based on a combination of the future value and the pre-classification. For instance, the data status provider 320 may categorize the KPI as failure based on both the future value being less than the target KPI value at the end of the KPI period or at the project closure date as well as the KPI being pre-classified as failure. Else, the data status provider 320 may categorize the KPI as success. Upon being categorized as failure, the data status provider 320 may add such KPI to the list of KPIs associated with the "failed" category in the historical data 335 for retraining the second trained data model 345-2. However, if the future value may be equal to or greater than the target KPI value while the KPI being pre-classified as failure, the data status provider 320 may continue to monitor the KPI until the end of the KPI period or the project closure date, whichever may be set. Similarly, upon being classified as success, the data status provider 320 may add such KPI to a list of KPIs associated with the "success" category in the historical data 335 for retraining the second trained data model 345-2. If the KPI may be pre-classified as success based on a change in value related to the KPI due to a received recommendation, the data status provider 320 may record such recommendation or a value related thereto as an ideal recommendation for similar type of KPIs in future projects. Moreover, the retrained second data model 345-2 may be utilized by the recommender 325 to improve the relevance of recommendations for improving the KPI performance. In other instances, the list of KPIs associated with the "success" category may also be used by the data classifier 310 for training or retraining a third data model 345-3 for recommending one or more relevant KPIs that may be selected or tracked based on the input data such as a project type and an expected outcome (e.g., a KPI benefit value greater than a threshold target KPI benefit value). The third trained data model 345-3 may include any suitable classification data model known in the art including, but not limited to, SVM model and Naïve Bayes model; however, other instances may include a statistical data model or a combination of statistical and classification data model.

The data status provider 320 may further calculate the initiative cost performance based on the cost targets set previously. The cost performance may define an initiative cost benefit at the end of a set duration such as the project closure date. The data status provider 320 may calculate the cost performance based on a difference between the cost target and an actual cost of implementing the initiative up to at least one interval of the project period. Accordingly, the cost performance may assist to determine a cost variance, as indicated by "Actual Variance" in FIG. 6H, at each set interval during the KPI period. Further, the data status provider 320 may calculate a benefit value for a KPI based on associated initiative-level benefits indicated by the cost performance of all the initiatives mapped to the KPI. For example, as shown in Equation (2), the KPI benefit value may be calculated by the data status provider 320 as a sum of cost performances of each of the initiatives associated with the KPI over an intended period (e.g., KPI period, project period, or an interval related thereto). Similarly, the data status provider 320 may also calculate a net present value of the initiative based on the financial benefits from KPI (i.e., KPI benefit value) and the cost of implementation of the initiative. The net present value may define a project value at the most granular level. In one example, the data status provider 320 may calculate the net present value based on a difference between the financial benefits from KPI (KPI benefit value) and the cost of implementing each initiative at each of the intervals during an intended period.

The data status provider 320 may categorize an initiative based on one of the corresponding net present value and the related KPI being categorized as failure. For instance, the data status provider 320 may categorize the initiative as failure if actual net present value falls below, i.e., is less than, the target net present value. Else, the data status provider 320 may categorize the initiative as success when the actual net present value is equal to or exceeds the target net present value.

In another example, the data status provider 320 may categorize the initiative based on a combination of the net present value and the KPI categorization. For instance, the data status provider 320 may categorize the initiative as failure based on both the net present value being less than the target value at the end of the initiative period as well as the related KPI(s) being categorized as failure. Else, the data status provider 320 may categorize the initiative as success. However, if the net present value may be equal to or greater than the target net present value while the related KPI(s) being categorized as failure, the data status provider 320 may still categorize the initiative as failure.

Figure 6J:
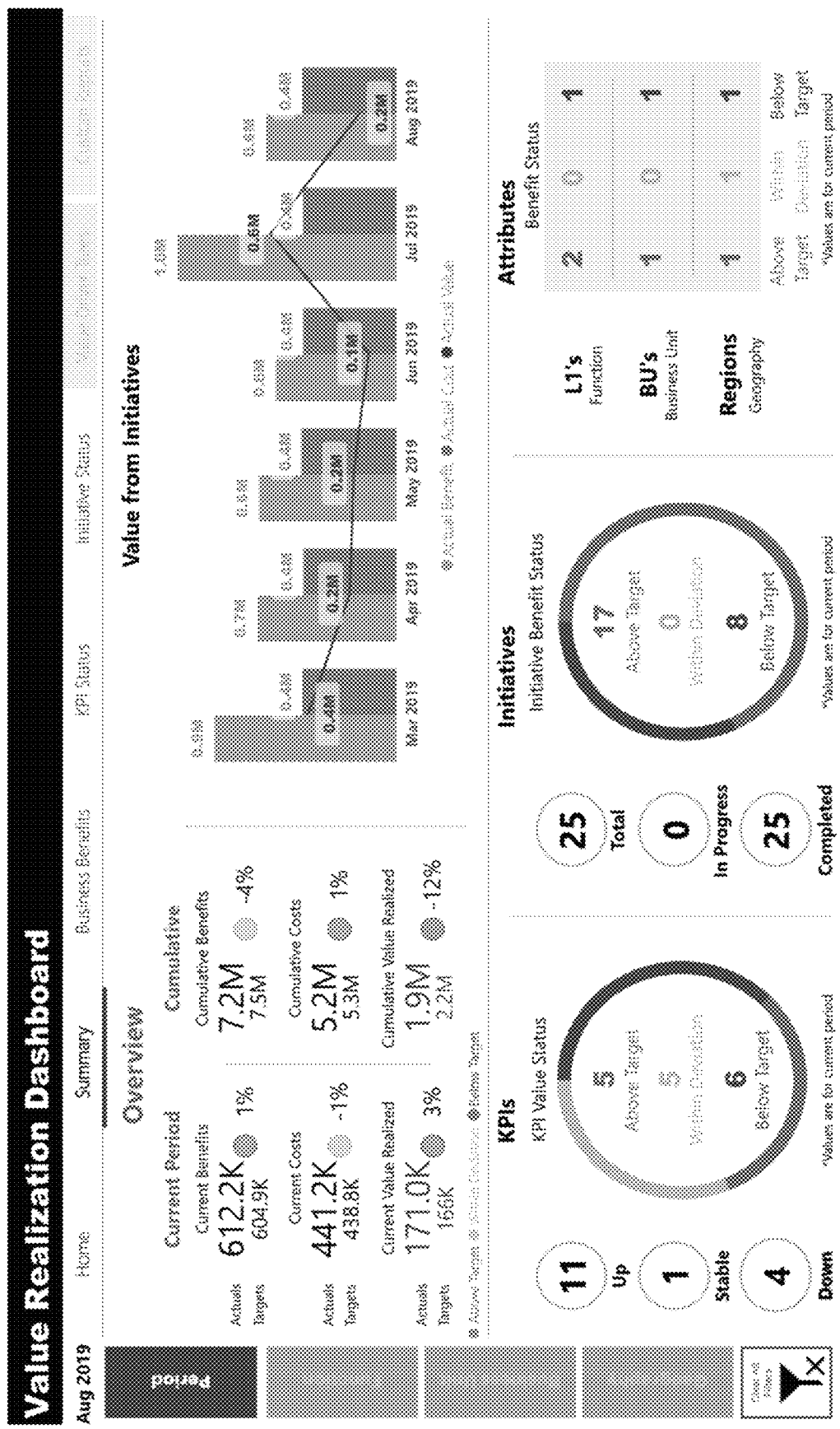
Figure 6K:
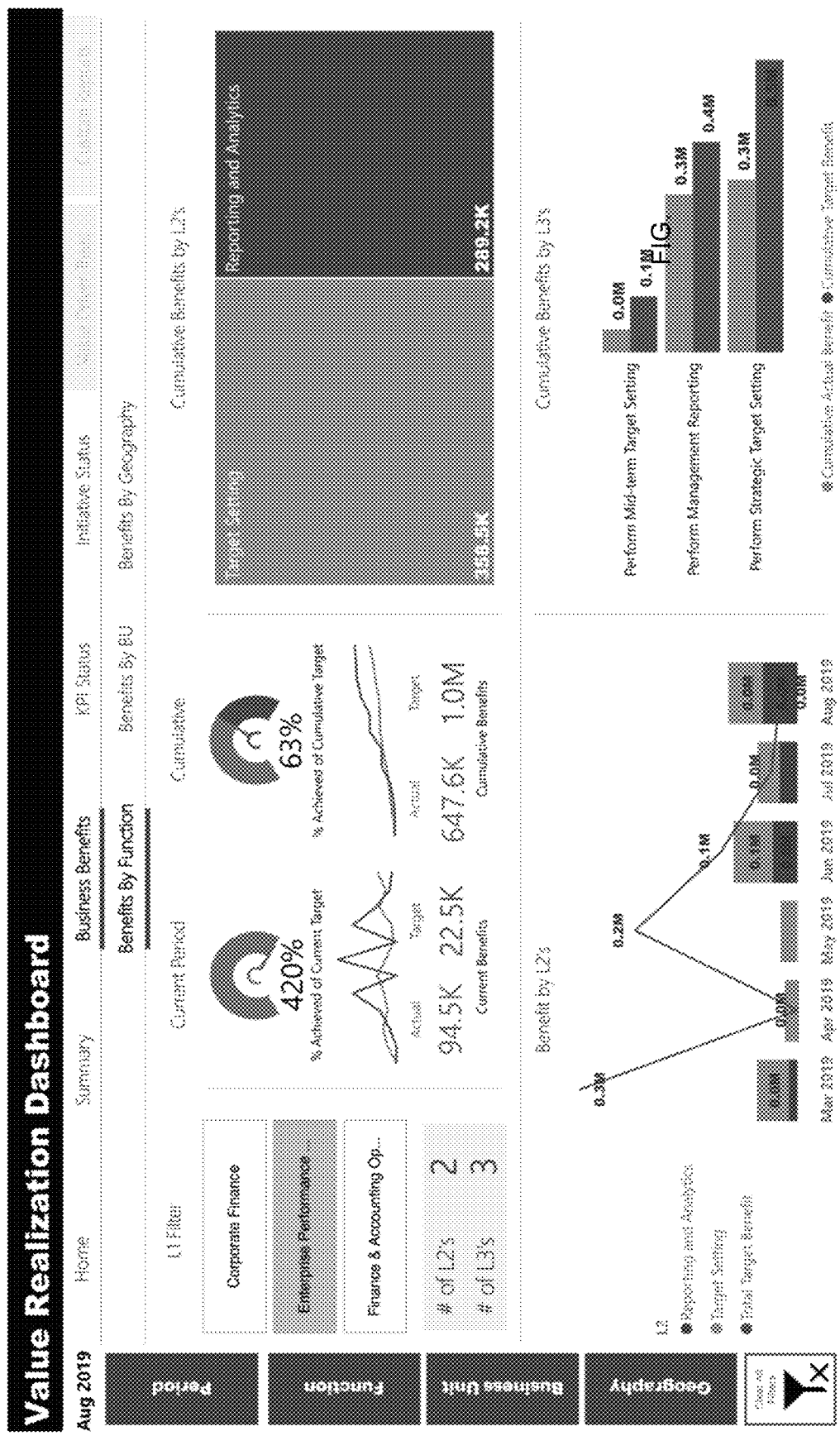
Figure 6L:
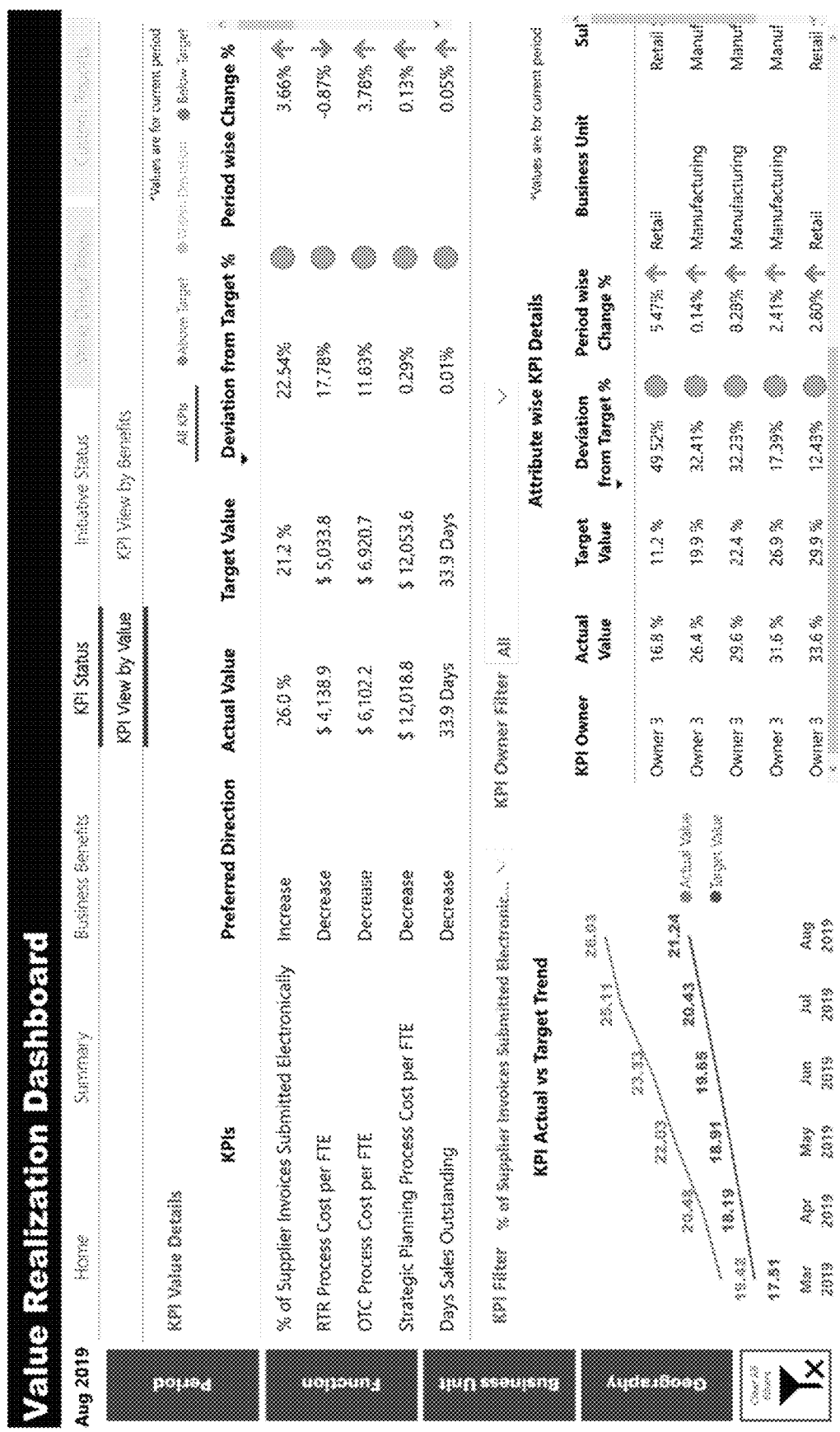
Figure 6M:
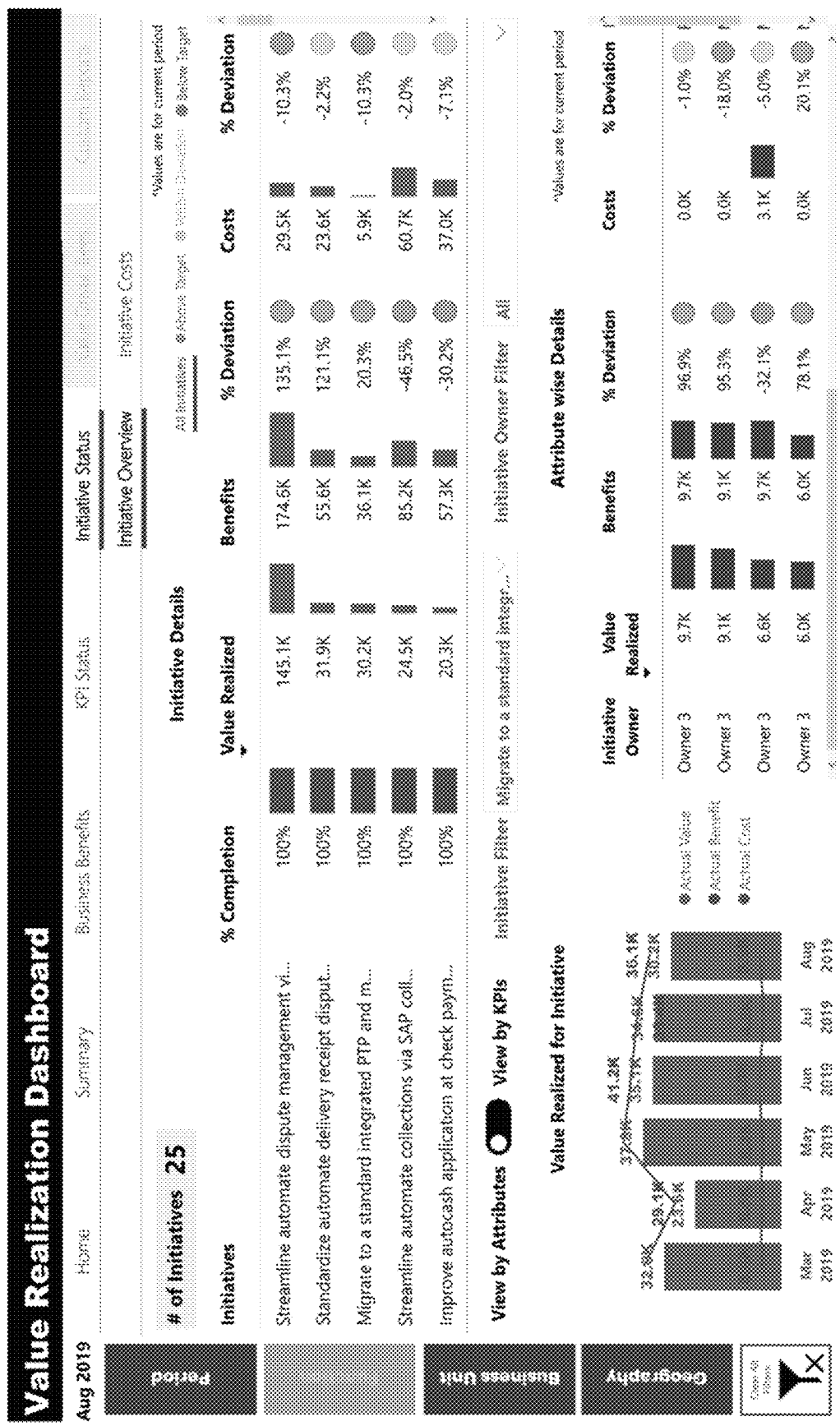

The data status provider 320 may send the initiative, the related KPI, and their respective categorizations to the recommender 325 for providing relevant recommendations. In some examples, the data status provider 320 may display the calculated values, related attributes, as well as categorizations on the output device 725 of the system 110. For example, the data status provider 320 may display on a dashboard of the system 110 the forecasted KPI values, the initiative cost values, the initiative cost benefit (or cost performance) at different intervals during the corresponding KPI period and initiative period filtered by, for example, (i) a timeline as illustrated in FIG. 6J, (ii) a business function as indicated in FIG. 6K, (iii) a change in KPI value, as indicated in FIG. 6L, to showcase KPI values and costs trends until the project closure date, and (iv) initiatives related to the KPI, as indicated in FIG. 6M, to showcase an initiative-level value and costs trends until the project closure date. In some instances, the data status provider 320 may also display cumulative KPI values and the KPI benefit value on the output device 725 of the system.

The recommender 325 may correspond to a component for providing a recommendation to improve the financial performance of the KPI (or the KPI benefit value). In one embodiment, the recommender 325 may provide a recommendation in response to both the KPI and the initiative being categorized as failure by the data status provider 320. The recommendation may be provided to assist in initiating a process to optimize the financial performance of the KPI (or the KPI benefit value) and/or the net present value, to enhance the overall project value. The recommendation may be based on one of a user feedback, a set formula for the KPI, and a historical recommendation for the KPI.

In one example, the recommender 325 may provide a recommendation A based on a set formula. For instance, for a finance function, the recommender 325 may provide a recommendation to adjust the actual KPI value based on Equation 2.

$$\text{Benefit formula} = (\text{Change in KPI value})*(B/C)*D \quad (2)$$

Where:
Change in KPI value=Calculated between intended intervals during the KPI period
B=Current Revenue
C=number of days in the interval
D=Weight average cost of capital Similar to Equation 2, each KPI may have be associated with respective set calculation formula. Values in the formula may be adjusted in a reverse computation to recommend what may be achievable goals and targets. The KPI benefit formula may assist to recognize a preliminary state to identify quick wins and may be discarded over time once enough data on feedback may be accumulated for different scenarios to have instructive reinforcement.

In another example, the recommender 325 may provide a recommendation B based on a user input to undertake initiatives/additional actions that would help meet KPI target values. For instance, an entity (e.g., a person, device, or AI system) operating as a subject matter expert may assist to provide a standard set of recommendations to start new initiatives/take additional actions which could help improve the KPI performance based on the KPI name, project type etc. In still another instance, the recommender 325 may provide a recommendation C based on a user input to adjust the target data. For instance, an entity (e.g., a person, device, or AI system) may assist to provide a recommendation to adjust the –KPI target value in scenarios where the KPI may be classified as failure primarily because the target values may be not in-line with expected improvements, i.e., the target value being different from a historical target value set for the same KPI in the KPI cluster. Such target data adjustment may help to expand the scope of the recommendation to similar projects or initiatives and KPIs with a higher confidence.

In a further example, the recommender 325 may provide a recommendation D based inputs from an entity (e.g., a person, device, or AI system) on what corrective actions were taken in other similar historical projects where that KPI or similar KPI(s) may be classified as failure but was eventually updated to success during the project period or at the project closure date. The recommender 325 may provide the one or more of the generated recommendations using on the second trained data model 345-2 or the third trained data model 345-3 based on attributes/features of the KPI and/or project type. The generated recommendations may be sent to the recalibrator 330 or stored in the database 414 for future access.

The recalibrator 330 may correspond to a component for initiating a recalibration process for improving the financial performance of the KPI (or KPI benefit value) and/or the net present value of the related initiatives based on the provided recommendations. For example, the recalibrator 330 may select one of the recommendations A, B, C, and D based on the maturity of the recommendation model such as the second trained data model 345-2 and the third trained data model 345-3. During the initial phases when the historical data 335 is relatively small, the recommendations A and B may be more common, but as more projects are undertaken resulting in having a large historical dataset 335, the recommendations C and D are expected to become more common. The recalibrator 330 may then calculate a future performance of the KPI based on the recalibrated parameter (e.g., related initiative, KPI period, target KPI value, project closure date, etc.) and select a final recommendation from the received recommendations based on the final recommendation providing the highest project value or the highest future performance of the KPI (or future KPI performance). The selected final recommendation may be assigned a weight based on providing the highest change in the future KPI performance (e.g., a change in KPI value, KPI benefit value, and/or related initiative cost performance over an intended period) relative to that provided by the adjustment of other parameters in line with the remaining recommendations. In some examples, a weight may be assigned to the selected recommendation based on the corresponding future KPI performance being positive. In some other examples, a weight may be assigned to the selected recommendation based on the corresponding future KPI performance being greater than a predefined threshold value or a historical KPI performance for a similar project type. The weighted recommendation may be stored as recommendation data in the data repository for subsequent analysis for the same active project or another project.

Figure 7:
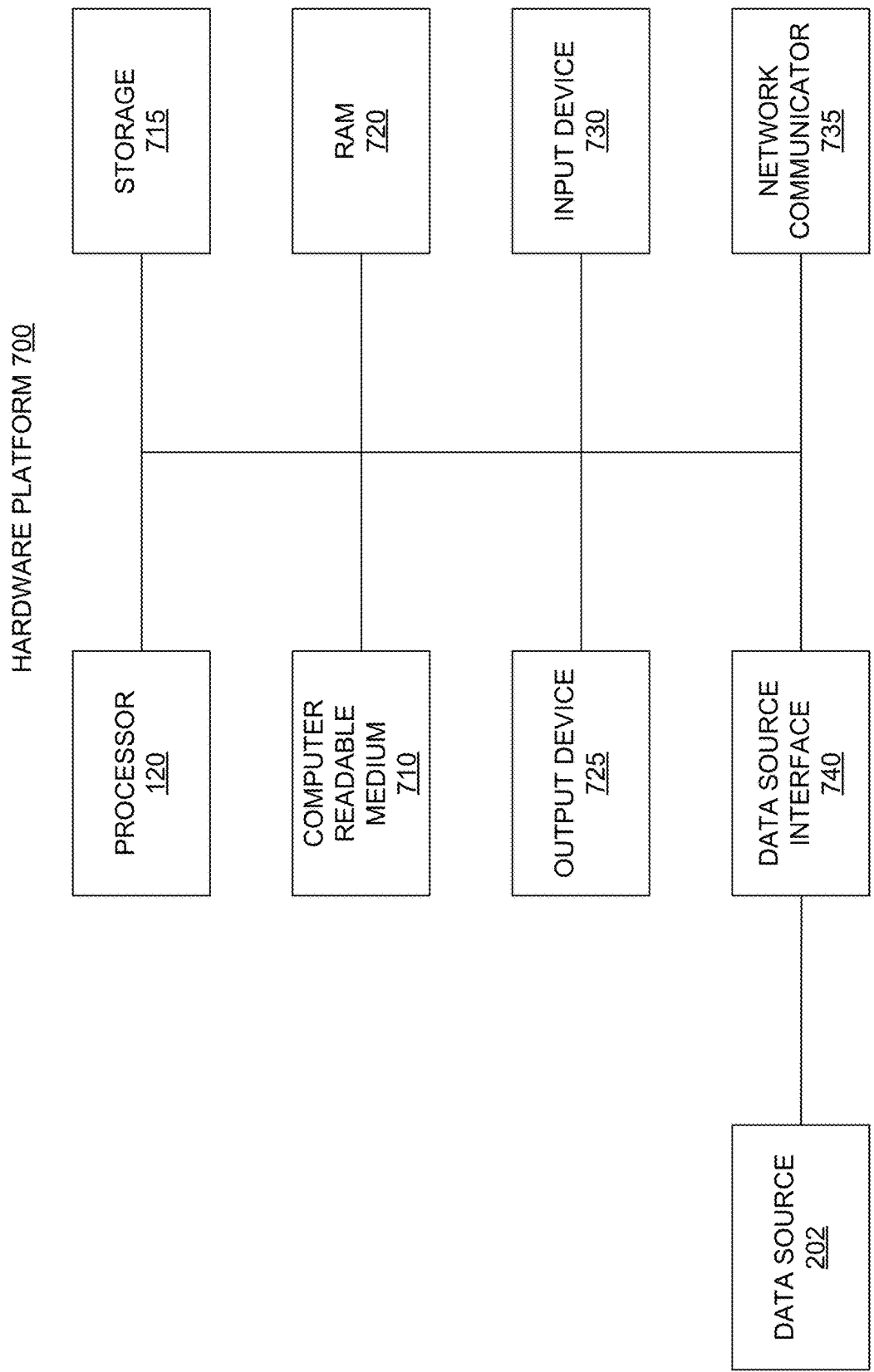
FIG. 7 illustrates a hardware platform for implementing the system of FIG. 1, according to an example embodiment of the present disclosure.

FIG. 7 illustrates a hardware platform 700 for the implementation of the system 110 of FIG. 1, according to an embodiment of the present disclosure. For the sake of brevity, construction and operational features of the system 110 which are explained in detail above are not explained in detail herein. Particularly, computing machines such as but not limited to internal/external server clusters, quantum computers, desktops, laptops, smartphones, tablets, and wearables which may be used to execute the system 110 or may have the structure of the hardware platform 700. As illustrated, the hardware platform 700 may include additional components not shown and that some of the components described may be removed and/or modified. For example, a computer system with multiple GPUs may be located on external-cloud platforms including Amazon Web Services™, or internal corporate cloud computing clusters, or organizational computing resources, etc.

The hardware platform 700 may be a computer system such as the system 110 that may be used with the embodiments described herein. For example, the computer system 110 may represent a computational platform that includes components that may be in a server or another computer system 110. The computer system 110 may execute, by a processor such as the processor 120 (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 110 may include the processor 120 that executes software instructions or code stored on a non-transitory computer-readable storage medium 710 to perform methods of the present disclosure. The software code includes, for example, instructions to gather data and documents and analyze documents. In an example, the data retriever 130, the data refiner 140, and the project value predictor 150 may be software codes or components performing these steps.

The instructions on the computer-readable storage medium 710 are read and stored the instructions in storage 715 or in random access memory (RAM) 720. The storage 715 may provide a space for keeping static data where at least some instructions could be stored for later execution. The stored instructions may be further compiled to generate other representations of the instructions and dynamically stored in the RAM such as RAM 720. The processor 120 may read instructions from the RAM 720 and perform actions as instructed.

The computer system 110 may further include an output device 725 to provide at least some of the results of the execution as output 350 including, but not limited to, visual information to users, such as external agents. The output device 725 may include a display on computing devices and virtual reality glasses. For example, the display may be a mobile phone screen or a laptop screen. GUIs and/or text may be presented as an output 350 on the display screen. The computer system 110 may further include an input device 730 to provide a user or another device with mechanisms for entering data and/or otherwise interact with the computer system 110. The input device 730 may include, for example, a keyboard, a keypad, a mouse, or a touchscreen. Each of the output device 725 and input device 730 may be joined by one or more additional peripherals. For example, the output device 725 may be used to display results of the data retriever 130, the data refiner 140, and/or the project value predictor 150.

A network communicator 735 may be provided to connect the computer system 110 to a network and in turn to other devices connected to the network including other clients, servers, data stores, and interfaces, for instance. A network communicator 735 may include, for example, a network adapter such as a LAN adapter or a wireless adapter. The computer system 110 may include a data source interface 740 to access any data source such as the data source 202, which may be an information resource. As an example, a database of exceptions and rules may be provided as the data source 202. Moreover, knowledge repositories and curated data may be other examples of the data source 202.

Figure 8B:
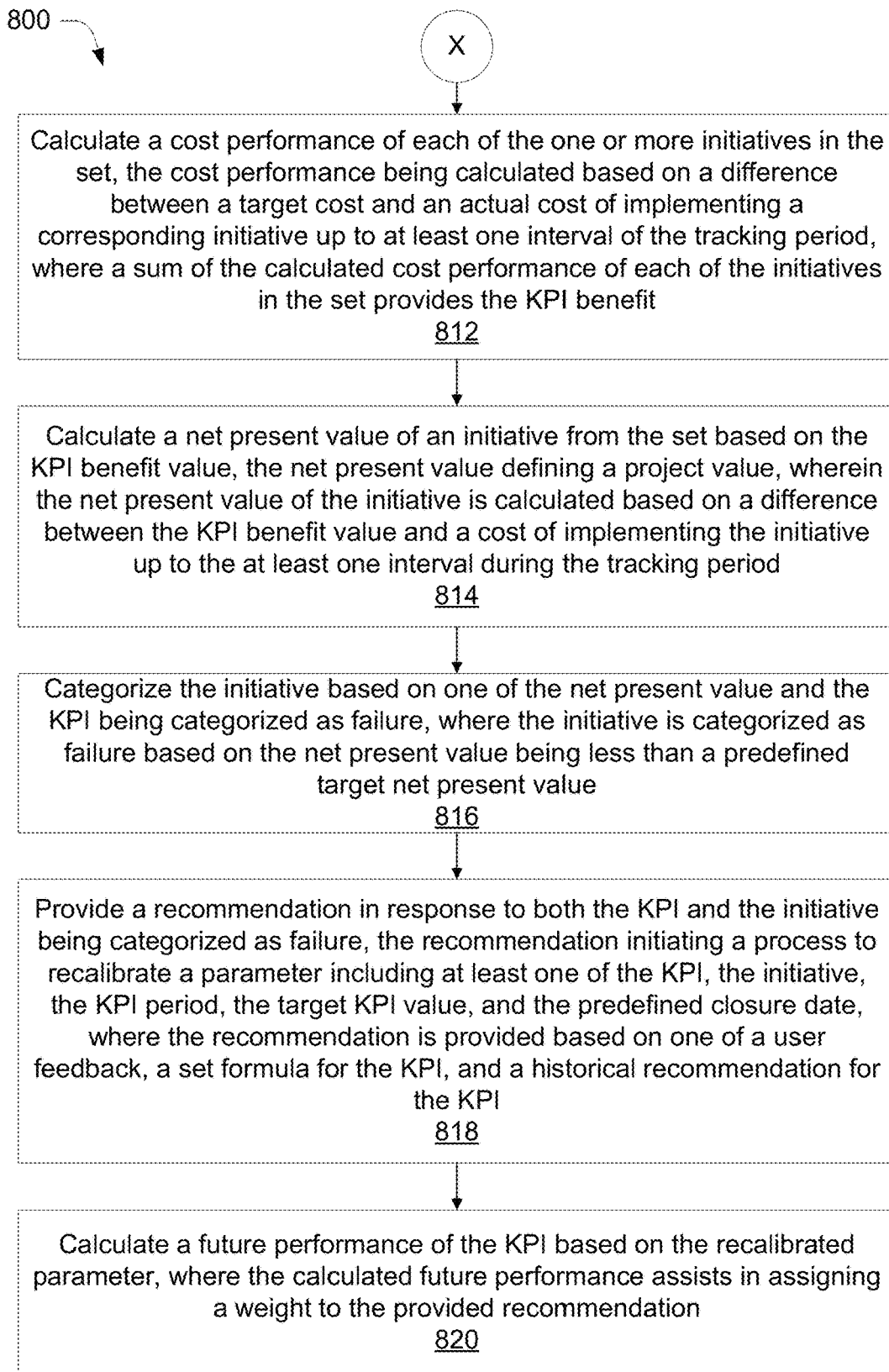

FIG. 8 illustrate a method for implementing the system 110 of FIG. 1, according to an example embodiment of the present disclosure.

The method 800 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 800 is described is not intended to be construed as a limitation, and any number of the described method blocks may be combined or otherwise performed in any order to implement the method 800, or an alternate method. Additionally, individual blocks may be deleted from the method 800 without departing from the spirit and scope of the present disclosure described herein. Further, the method 800 may be implemented in any suitable hardware, software, firmware, or combination thereof, that exists in the related art or that is later developed.

The method 800 describes, without limitation, an implementation of the system 110. A person of skill in the art will understand that the method 800 may be modified appropriately for implementation in various manners without departing from the scope and spirit of the disclosure. The method 800 may be implemented, in at least some embodiments, by the project value predictor 150 of the system 110. For example, the project value predictor 150 may use the processor(s) 120 to execute computer instructions to perform operations for issue prediction based on analysis.

At step 802, a KPI and a related initiative for an active project having a predefined closure date. In one embodiment, the data retriever 130 may receive input data including the project set-up data, the KPI and initiative data, and the benchmarking data. The input data relating to an active project may form the live data 340 and that related to a historical project may form the historical data 335. The project set-up data may include a project type, industry/function, geographical indicator (e.g., region, country, etc.), location type, a project start date, a project closure date, and a project period extending therebetween. The KPI data and initiative data may include the KPI data and the cost data. The KPI data may include a KPI name, KPI improvement trend, KPI user inputs, KPI formulas, values and initiative(s) impacting the KPI, a KPI start date, a KPI end date, and a KPI period extending therebetween having one or more intervals. For each KPI, the KPI data may include a baseline KPI value, a target KPI value, and a current KPI value at each of the intervals during the KPI period. The KPI data may further include initiative data related to each of the KPIs. For each KPI, the initiative data may include a set of one or more initiatives, an initiative start date, an initiative end date, and an initiative period extending therebetween. Further, for each initiative, the cost data may include cost items, a target or maximum cost value at each of the intervals during the initiative period as well as incurred initiative cost values at each of the intervals during the initiative period. The process hierarchy may relate to a hierarchy of processes including related categories based on an industry/function, such as sales and finance, defining preset attributes of a KPI. Relating to the historical data 335, the KPI data may also include a set of KPI clusters and the benchmarking data. Each KPI cluster may be a collection of one or more KPIs having common or shared attributes or features. In some examples, the KPI cluster may include the KPIs having a majority of attributes and/or features being same or similar. In some other examples, each KPI cluster may be associated a cluster target value operating as the benchmarking data. However, other examples may include the benchmarking data providing separate KPI benchmark value for each KPI or the KPI cluster. In further examples, such KPI benchmark value may be provided by a user.

At step 804, a relevant KPI cluster for the KPI may be identified from a set of KPI clusters defined based on historical project data 204. During the live mode of the system 110, the project value predictor 150 may identify a relevant KPI cluster for each of the KPIs. In the project value predictor 150, the data analyzer 315 may identify attributes/features of the KPI and compare them with those of each of the KPI clusters in the historical data 335. These features may relate to the attributes (e.g., industry or function, geographical location, location type, etc.), the received process hierarchy, variable defining or implementing the KPI, or any set formulas, names, or flags associated with KPI names. The features may further relate to the initiatives mapped or related to the KPI. Based on the features, the KPI cluster including a majority number of attributes/features associated with the KPI may be identified as relevant for that KPI.

At step 806, a future value of the KPI is forecasted. In one embodiment, the project value predictor 150 may forecast a future value of the KPI based on the historical data 335. In the project value predictor 150, the data status provider 320 may forecast the future value of the KPI using the current value of the KPI using the first trained data model 345-1, which may be trained using the historical data 335 and/or attributes/features of the relevant KPI cluster related to the KPI. The future value may pertain to a forecasted KPI value at the end of the KPI period or the project closure date. In some instances, the forecasted value may be a cumulative value of KPI values at different predefined intervals during the KPI period till date. The future value may be forecasted based on a value of the KPI being precomputed based on a set formula at one of the plurality of intervals, e.g., the last interval indicating an end of the KPI period, or the project closure date or a known value of the same KPI in the relevant KPI cluster after a duration equivalent to the KPI period based on the trained data model.

At step 808, a possibility of failure of the KPI is predicted based on the historical project data 204 to pre-classify the KPI. In one embodiment, the data status provider 320 may predict the possibility of failure of each KPI using the second trained data model 345-2 based on a comparison between features of the KPI and those of a list of KPIs associated with a "failed" category in the historical data 335. Upon comparison, the KPI may be pre-classified as failure based on the KPI belonging or similar to any KPI that has been labelled as failure in the list.

At step 810, the KPI is categorized based on one of the future value and the pre-classification of the KPI. The KPI may be categorized into a set category, for example, namely "success" and "failure" based on at least one of the future value and the pre-classification of the KPI. The KPI categorization or the corresponding KPI category may indicate financial performance and assist in optimizing the financial performance of the KPI. For instance, the KPI may be categorized as failure based on at least the future value being less than the target KPI value at the end of the KPI period or at the project closure date. In another instance, the KPI may be categorized as failure based on both the future value being less than the target KPI value at the end of the KPI period or at the project closure date as well as the KPI being pre-classified as failure. Else, the data status provider 320 may categorize the KPI as success or keep it under a "monitor" state. Upon being categorized as failure, the data status provider 320 may add such KPI to the list of KPIs associated with the "failed" category in the historical data 335 for retraining the second trained data model 345-2. However, if the future value may be equal to or greater than the target KPI value while the KPI being pre-classified as failure, the data status provider 320 may continue to monitor the KPI until the end of the KPI period or the project closure date, whichever may be set. Similarly, upon being classified as success, the data status provider 320 may add such KPI to a list of KPIs associated with the "success" category in the historical data 335 for retraining the second trained data model 345-2 or the third trained data model 345-3 for improving the relevance of recommendations generated using these models 345-2 and 345-3.

At step 812, the cost performances of the related initiatives may be calculated based on the cost targets. The cost performance may define an initiative cost benefit at the end of a set duration such as the KPI period or the project closure date. The cost performance may be calculated as a difference between the target cost and an actual cost of implementing an initiative up to at least one interval of an intended period such as the initiative period, KPI period, project period, or an interval related thereto. Similarly, the cost performance may be calculated by the data status provider 320 for each of the initiates associated with a KPI. Accordingly, the cost performance may assist to determine a cost variance at each set interval during the initiative period. The a sum of the calculated cost performance of each of the initiatives may provide a benefit value for the KPI (or the KPI benefit value).

At step 814, a net present value of the initiative is calculated based on the financial performance of the KPI (or the KPI benefit value) and the cost of implementing the initiative during an intended period. The net present value may define a project value at the most granular level. In one example, the net present value may be calculated based on a difference between the financial benefits from KPI (KPI benefit value) and the cost of implementation for each initiative at each of the intervals during the project period.

At step 816, the initiative is categorized based on one of the net present value and the KPI being categorized as failure. Each initiative may be categorized based on at least one of the corresponding net present value and the related KPI being categorized as failure. For instance, the initiative may be categorized as failure if actual net present value falls below or is less than the target net present value. In another instance, the initiative may be categorized based on both the net present value being less than the target value at the end of the initiative period as well as the related KPI(s) being categorized as failure. Else, the initiative may be categorized as success. However, if the net present value may be equal to or greater than the target value while the related KPI(s) being categorized as failure, the initiative may still be categorized as failure.

At step 818, a recommendation is provided in response to both the KPI and the initiative being categorized as failure. The recommendation may initiate a process to optimize the KPI performance, where the initiated process may recalibrate a parameter including at least one of the KPI, the initiative, the KPI period, the target KPI value, and the predefined closure date. In one example, a recommendation A may be provided based on a set benefit formula associated with the KPI. Values in the formula may be adjusted in a reverse computation to recommend what may be achievable goals and targets. In another example, a recommendation B may be provided based on an input from an entity (e.g., person, device, AI system) to undertake initiatives/additional actions that may assist to meet KPI target values. In still another example, a recommendation C may be provided based on an input from the entity to adjust the benchmark data such as the KPI target value in scenarios where the KPI may be classified as failure primarily because the target values may not be in-line with expected improvements, i.e., the target value being different from a historical target value set for the same KPI in the KPI cluster. Such target data adjustment may help to expand the scope of the recommendation to similar projects or initiatives and KPIs with a higher confidence. In a further example, a recommendation D may be provided from an entity (e.g., a person, device, or AI system) on what corrective actions may be taken in other similar projects where that KPI/similar KPI(s) may be classified as failure but was eventually updated to success during the project/at the project closure date. In an embodiment, one of the recommendations A, B, C, and D based on the maturity of the recommendation model such as the second trained data model 345-2 or the third trained data model 345-3. During the initial phases, the recommendations A and B may be more common, but as more projects are undertaken resulting in having a large historical dataset 335, the recommendations C and D are expected to become more common.

At step 820, a future performance of the KPI is calculated based on the recalibrated parameter. In one embodiment, the recalibrator 330 may calculate a future performance of the KPI (future KPI performance) based on each of the parameters suggested by each of the recommendation A, B, C, and D for recalibration. The final recommendation for recalibration may be selected based on the one that provides the highest project value or the highest future performance of the KPI. In some examples, the selected final recommendation may be assigned a weight based on (i) providing the highest change in the future performance as compared to other recommendations, the corresponding future performance being positive, (iii) the corresponding future performance being greater than a predefined threshold value or a historical performance for a similar project type. In some other examples, based on the assigned weight to the final recommendation, another appropriate weight may be assigned to each other remaining recommendations.

The present disclosure provides a value realization analytics system 110 implementing predictive and prescriptive analytics to dynamically forecast, classify/categorize, recommend, assign, reassign, calibrate, and recalibrate process parameters. The present disclosure may track and determine a financial benefit being realized across multiple dimensions (e.g., industry/business function, business/service unit or a type thereof, geographical indicator, etc.) for a project during an intended period comparative to a benefit obtained for a historical project. The present disclosure may actively and periodically monitor KPIs and initiatives operating to implement a real-time project. The present disclosure may also help optimize project cost/benefit values as well as process performance and provide insights into a return-on-investment (ROI) on demand. The present disclosure may further recommend various inputs including those related to KPIs and initiatives for implementing a project. The present disclosure may also help initiate processes for recalibrating project inputs to optimize financial benefits obtainable over an intended period before a violation of established metrics or incurring a financial loss. The present disclosure may also help define and/or update benchmarking data relating to parameters based on a project type across different business units and geographies.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system for dynamic performance optimization, the system comprising:
 a processor; and
 memory storing executable instructions, which, when executed by the processor cause to:
 train a multivariate regression model and a classification model based on historical data to provide a first trained data model and a second trained model;
 receive, from a client device, a Key Performance Indicator (KPI) and a set of one or more initiatives related thereto over a network through a user interface for an active project having a predefined closure date, the KPI indicating a parameter used to measure a performance of the active project relative to preset metrics, the KPI being associated with a KPI period and a target KPI value, wherein the KPI period includes a plurality of intervals and defines a tracking period for the KPI;
 identify a relevant KPI cluster for the KPI from a plurality of KPI clusters defined based on historical project data, the relevant KPI cluster including one or more KPIs and associated with a cluster target value, wherein the KPI cluster is identified as relevant upon having a maximum number of key attributes among the plurality of KPI clusters being associated with the KPI;
 forecast a future value of the KPI based on the first trained model, the future value corresponding to an end-period KPI value, wherein the future value is forecasted based on the key attributes of the KPI with at least one of a value of the KPI being precomputed at one of the plurality of intervals and a known value of the same KPI in the relevant KPI cluster after a duration equivalent to the KPI period;

predict a possibility of failure of the KPI based on the second trained model to pre-classify the KPI, wherein the KPI is pre-classified as failure based on the KPI belonging to the list;

categorize the KPI based on one of the future value and the pre-classification of the KPI, the categorization indicating a KPI benefit, the KPI being categorized as failure based on the future value being less than the target KPI value after the KPI period, wherein the KPI categorized as the failure is added to the list for retraining the second trained model;

retrain the second trained model based on the KPI being categorized as failure;

recalibrate a parameter including at least one of the KPI, the KPI period, and the target KPI value based on the retrained second trained model by adjusting the parameter according to a set formula; and display a possibility of success obtained based on the recalibrated parameter.

2. The system of claim 1, wherein the attributes relate to one of a geographical location, a location type, a service or process, a service or process domain, and an industry domain.

3. The system of claim 1, wherein the processor categorizes the KPI as failure based on a combination of the future value and the pre-classification of the KPI being failure.

4. The system of claim 1, wherein the processor further operates to:

calculate a cost performance of each of the one or more initiatives in the set, the cost performance being calculated based on a difference between a target cost and an actual cost of implementing a corresponding initiative up to at least one interval of the tracking period;

calculate a net present value of an initiative from the set based on the KPI benefit value, the net present value defining a project value, wherein the net present value of the initiative is calculated based on a difference between the KPI benefit value and a cost of implementing the initiative up to the at least one interval during the tracking period;

categorize the initiative based on one of the net present value and the KPI being categorized as failure, wherein the initiative is categorized as failure based on the calculated net present value being less than a predefined target net present value;

provide a recommendation in response to both the KPI and the initiative being categorized as failure, the recommendation initiating a process to recalibrate the parameter, wherein the recommendation is provided based on one of a user feedback, a set formula for the KPI, and a historical recommendation for the KPI; and calculate a future performance of the KPI based on the recalibrated parameter, wherein the calculated future performance assists in assigning a weight to the provided recommendation.

5. The system of claim 4, wherein the value of the KPI is precomputed based on the set formula.

6. The system of claim 4, wherein the KPI period extends up to the predefined closure date and wherein the at least one interval is the last interval of the KPI period.

7. The system of claim 4, wherein the processor categorizes the initiative as failure based on a combination of the net present value and the KPI being categorized as failure, and wherein the initiative has a causal relationship with the KPI.

8. The system of claim 4, wherein the processor further operates to assign the weight to the recommendation based on the future performance being one of positive and greater than a predefined threshold value or a historical performance.

9. A method for dynamic performance optimization, the method comprising:

training, by a processor, a multivariate regression model and a classification model based on historical data to provide a first trained data model and a second trained model;

receiving, by the processor, from a client device, a Key Performance Indicator (KPI) and a set of one or more initiatives related thereto over a network through a user interface for an active project having a predefined closure date, the KPI indicating a parameter used to measure a performance of the active project relative to preset metrics, the KPI being associated with a KPI period and a target KPI value, wherein the KPI period includes a plurality of intervals and defines a tracking period for the KPI;

identifying, by the processor, a relevant KPI cluster for the KPI from a plurality of KPI clusters defined based on historical project data, the relevant KPI cluster including one or more KPIs and associated with a cluster target value, wherein the KPI cluster is identified as relevant upon having a maximum number of key attributes among the plurality of KPI clusters being associated with the KPI;

forecasting, by the processor, a future value of the KPI based on the first trained model, the future value corresponding to an end-period KPI value, wherein the future value is forecasted based on the key attributes of the KPI with at least one of a value of the KPI being precomputed at one of the plurality of intervals and a known value of the same KPI in the relevant KPI cluster after a duration equivalent to the KPI period;

predicting, by the processor, a possibility of failure of the KPI based on the second trained model to pre-classify the KPI, wherein the KPI is pre-classified as failure based on the KPI belonging to the list;

categorizing, by the processor, the KPI based on one of the future value and the pre-classification of the KPI, the categorization indicating a KPI benefit, the KPI being categorized as failure based on the future value being less than the target KPI value after the KPI period, wherein the KPI categorized as the failure is added to the list for retraining the second trained model;

retraining, by the processor, the second trained model based on the KPI being categorized as failure;

recalibrating, by the processor, a parameter including at least one of the KPI, the KPI period, and the target KPI value based on the retrained second trained model by adjusting the parameter according to a set formula; and displaying, by the processor, a possibility of success obtained based on the recalibrated parameter.

10. The method of claim 9, wherein the attributes relate to one of a geographical location, a location type, a service or process, a service or process domain, and an industry domain.

11. The method of claim 9, wherein the KPI is categorized as failure based on a combination of the future value and the pre-classification of the KPI being failure.

12. The method of claim 9, further comprising:

calculating, by the processor, a cost performance of each of the one or more initiatives in the set, the cost performance being calculated based on a difference between a target cost and an actual cost of implementing a corresponding initiative up to at least one interval of the tracking period, wherein a sum of the calculated cost performance of each of the initiatives in the set provides the KPI benefit value;

calculating, by the processor, a net present value of an initiative from the set based on the KPI benefit value, the net present value defining a project value, wherein the net present value of the initiative is calculated based on a difference between the KPI benefit value and a cost of implementing the initiative up to the at least one interval during the tracking period;

categorizing, by the processor, the initiative based on one of the net present value and the KPI being categorized as failure, wherein the initiative is categorized as failure based on the calculated net present value being less than a predefined target net present value;

providing, by the processor, a recommendation in response to both the KPI and the initiative being categorized as failure, the recommendation initiating a process to recalibrate the parameter, wherein the recommendation is provided based on one of a user feedback, a set formula for the KPI, and a historical recommendation for the KPI; and calculating, by the processor, a future performance of the KPI based on the recalibrated parameter, wherein the calculated future performance assists in assigning a weight to the provided recommendation.

13. The method of claim 12, wherein the value of the KPI is precomputed based on the set formula.

14. The method of claim 12, wherein the KPI period extends up to the predefined closure date and wherein the at least one interval is the last interval of the KPI period.

15. The method of claim 12, wherein the initiative is categorized as failure based on a combination of the net present value and the KPI being categorized as failure, and wherein the initiative has a causal relationship with the KPI.

16. The method of claim 12, wherein the weight is assigned to the recommendation based on the future performance being one of positive and greater than a predefined threshold value or a historical performance.

17. A non-transitory computer readable medium for dynamic performance optimization, the non-transitory computer readable medium comprising machine executable instructions that are executable by a processor to:

train a multivariate regression model and a classification model based on historical data to provide a first trained data model and a second trained model;

receive, from a client device, a Key Performance Indicator (KPI) and a set of one or more initiatives related thereto over a network through a user interface for an active project having a predefined closure date, the KPI indicating a parameter used to measure a performance of the active project relative to preset metrics, the KPI being associated with a KPI period and a target KPI value, wherein the KPI period includes a plurality of intervals and defines a tracking period for the KPI;

identify a relevant KPI cluster for the KPI from a plurality of KPI clusters defined based on historical project data, the relevant KPI cluster including one or more KPIs and associated with a cluster target value, wherein the KPI cluster is identified as relevant upon having a maximum number of key attributes among the plurality of KPI clusters being associated with the KPI;

forecast a future value of the KPI based on the first trained model, the future value corresponding to an end-period KPI value, wherein the future value is forecasted based on the key attributes of the KPI with at least one of a value of the KPI being precomputed at one of the plurality of intervals and a known value of the same KPI in the relevant KPI cluster after a duration equivalent to the KPI period;

predict a possibility of failure of the KPI based on the second trained model to pre-classify the KPI, wherein the KPI is pre-classified as failure based on the KPI belonging to the list;

categorize the KPI based on one of the future value and the pre-classification of the KPI, the categorization indicating a KPI benefit, the KPI being categorized as failure based on the future value being less than the target KPI value after the KPI period, wherein the KPI categorized as the failure is added to the list for retraining the second trained model;

retrain the second trained model based on the KPI being categorized as failure;

recalibrate a parameter including at least one of the KPI, the KPI period, and the target KPI value based on the retrained second trained model by adjusting the parameter according to a set formula; and display a possibility of success obtained based on the recalibrated parameter.

18. The non-transitory computer readable medium of claim 17, wherein the KPI is categorized as failure based on a combination of the future value and the pre-classification of the KPI being failure.

19. The non-transitory computer readable medium of claim 17 including machine executable instructions, that are executable by the processor to further:

calculate a cost performance of each of the one or more initiatives in the set, the cost performance being calculated based on a difference between a target cost and an actual cost of implementing a corresponding initiative up to at least one interval of the tracking period, wherein a sum of the calculated cost performance of each of the initiatives in the set provides the KPI benefit value;

calculate a net present value of an initiative from the set based on the KPI benefit value, the net present value defining a project value, wherein the net present value of the initiative is calculated based on a difference between the KPI benefit value and a cost of implementing the initiative up to the at least one interval during the tracking period;

categorize the initiative based on one of the net present value and the KPI being categorized as failure, wherein the initiative is categorized as failure based on the calculated net present value being less than a predefined target net present value;

provide a recommendation in response to both the KPI and the initiative being categorized as failure, the recommendation initiating a process to recalibrate the parameter wherein the recommendation is provided based on one of a user feedback, a set formula for the KPI, and a historical recommendation for the KPI; and calculate a future performance of the KPI based on the recalibrated parameter, wherein the calculated future performance assists in assigning a weight to the provided recommendation.

20. The non-transitory computer readable medium of claim 19, wherein the KPI period extends up to the predefined closure date and wherein the at least one interval is the last interval of the KPI period.

* * * * *